United States Patent
Wang et al.

(10) Patent No.: US 7,359,493 B1
(45) Date of Patent: Apr. 15, 2008

(54) BULK VOICEMAIL

(75) Inventors: Myles Thomas Wang, San Francisco, CA (US); Michael McMorris, Dickerson, MD (US)

(73) Assignee: AOL LLC, a Delaware Limited Liability Company, Dulles, VA (US)

(*) Notice: Subject to any disclaimer, the term of this patent is extended or adjusted under 35 U.S.C. 154(b) by 647 days.

(21) Appl. No.: 10/411,398

(22) Filed: Apr. 11, 2003

Related U.S. Application Data

(60) Provisional application No. 60/371,431, filed on Apr. 11, 2002.

(51) Int. Cl.
*H04M 1/64* (2006.01)

(52) U.S. Cl. .............. 379/88.23; 379/88.13; 455/413; 704/500

(58) Field of Classification Search ............ 379/88.25, 379/88.13, 88.23; 709/200; 455/413; 704/500
See application file for complete search history.

(56) References Cited

U.S. PATENT DOCUMENTS

| | | | |
|---|---|---|---|
| 5,528,670 A * | 6/1996 | Elliot et al. ............. 379/88.25 |
| 5,557,659 A | 9/1996 | Hyde-Thomson | |
| 6,052,709 A | 4/2000 | Paul | |
| 6,069,940 A | 5/2000 | Carleton et al. | |
| 6,233,318 B1 | 5/2001 | Picard et al. | |
| 6,317,485 B1 | 11/2001 | Homan et al. | |
| 6,341,160 B2 | 1/2002 | Tverskoy et al. | |
| 6,342,901 B1 | 1/2002 | Adler et al. | |
| 6,389,276 B1 | 5/2002 | Brilla et al. | |
| 6,434,143 B1 | 8/2002 | Donovan | |
| 6,816,878 B1 * | 11/2004 | Zimmers et al. ............. 709/200 |

OTHER PUBLICATIONS

AOL Newsletters, Newsletter Center, pp. 1-4.

* cited by examiner

*Primary Examiner*—Gerald Gauthier
(74) *Attorney, Agent, or Firm*—Fish & Richardson P.C.

(57) ABSTRACT

Delivering a bulk voicemail to a group of recipients includes accessing a data store configured to store targeting data related to a group of potential voicemail recipients and identifying voicemail recipients from among the group of potential voicemail recipients based on the targeting data. A bulk voicemail is delivered to each identified voicemail recipient. The bulk voicemail includes at least some audio content that is made available to all recipients within the group of identified voicemail recipients.

56 Claims, 18 Drawing Sheets

BULK VOICEMAIL

CROSS REFERENCE TO RELATED APPLICATION

This application claims priority from U.S. Provisional Application No. 60/371,431 filed Apr. 11, 2002, and titled DIGITAL AND COMPUTER-ACCESSIBLE VOICEMAIL BOX, which is incorporated by reference.

TECHNICAL FIELD

This description relates to voicemail communications systems.

BACKGROUND

Network systems enable communication of messages between users. For example, an electronic mail system (or a compatible system) enables the communication of e-mail messages between users, and a voicemail system (or a compatible system) enables the communication of voicemail messages between users. Likewise, an integrated voicemail and e-mail system enables the communication of both voicemail and e-mail messages between users through a common user interface.

SUMMARY

In one general aspect, delivering a bulk voicemail to a group of recipients includes accessing a data store configured to store targeting data related to a group of potential voicemail recipients and identifying voicemail recipients from among the group of potential voicemail recipients based on the targeting data. A bulk voicemail is delivered to each identified voicemail recipient. The bulk voicemail includes at least some audio content that is made available to all recipients within the group of identified voicemail recipients.

Implementations may include one or more of the following features. For example, identifying voicemail recipients may include identifying voicemail recipients that subscribe to a bulk voicemail subscription service related to topics of interest to the identified voicemail recipients. The bulk voicemail subscription service may include a service that regularly delivers bulk voicemails related to topics of interest to the mailboxes of the identified voicemail recipients. The bulk voicemails delivered may include news content, music content, literary or spiritual content, advertising or promotional content, and content related to an online game.

Accessing the data store includes accessing demographic data for potential voicemail recipients, data related to online services received by the potential voicemail recipients, data related to personal interests of the potential voicemail recipients, data related to computer systems used by the potential voicemail recipients, and data related to the online social interactions of the potential voicemail recipients. The data related to computer systems used by the potential voicemail recipients may include data related to computer systems available for use by the potential voicemail recipients to access the bulk voicemail. The data related to online social interactions of the potential voicemail recipients may include data related to membership in a buddy list or in an online chat group.

Delivering a bulk voicemail may include delivering a bulk voicemail that includes entertainment content or promotional content related to products or services identified as desirable to the identified voicemail recipients. Accessing the data store may include accessing data related to products or services identified as desirable to the potential voicemail recipients.

Delivering a bulk voicemail may include delivering a bulk voicemail that includes information related to products or services received or purchased by the identified voicemail recipients such as, for example, customer service announcements. Accessing the data store may include accessing data related to products or services received or purchased by the potential voicemail recipients.

Delivering a bulk voicemail may include delivering a bulk voicemail to a mail system able to process and store voicemails and e-mails. The bulk voicemail may include a digital file including a header section, a contents section, and an attachments section. The attachments section may include an audio file that contains an audio message from a sender of the bulk voicemail to the identified voicemail recipients. The contents section may include textual contents and an embedded link that may be selected by the identified voicemail recipients to play the audio file.

Identifying voicemail recipients may include selecting an identified group of voicemail recipients from among multiple identified groups of voicemail recipients and querying the targeting data store to retrieve user identifiers corresponding to the identified voicemail recipients. Identifying voicemail recipients may include identifying one or more common characteristics of the voicemail recipients and querying the targeting data store to obtain user identifiers of potential voicemail recipients possessing the one or more common characteristics. The user identifiers may include e-mail addresses or screen names.

In another general aspect, a computer system to deliver bulk voicemails includes an authoring computer and an addressing and delivery computer. The authoring computer is configured to access a targeting data store to identify voicemail recipients from among a group of potential voicemail recipients based on targeting data that is stored in the targeting data store and is related to the group of potential voicemail recipients. The authoring computer also is configured to specify an audio file storing an audio message from the sender to the identified voicemail recipients. The audio message includes at least some audio content that is made available to all recipients within the group of identified voicemail recipients. The addressing and delivery computer is configured to generate and deliver the bulk voicemail including the audio message to each identified voicemail recipient.

Implementations may include one or more of the following features. For example, the computer system may further include the targeting data store. The authoring computer may be configured to enable a sender of the bulk voicemail to input textual contents of the bulk voicemail and/or to create the audio file storing the audio message.

The authoring computer may be configured to create a message file containing the audio file and a target group identifier corresponding to the identified voicemail recipients and to send the message file to the addressing and delivery computer. The addressing and delivery computer may be configured to receive the message file, address the message file by accessing the targeting data store to retrieve user identifiers corresponding to the identified voicemail recipients, convert the addressed message file into one or more bulk voicemails, and send the one or more bulk voicemails to the identified voicemail recipients.

The computer system may further include a mail handling system configured to receive the bulk voicemail and store the bulk voicemail in a mailbox of an identified voicemail recipient. The mail handling system may be configured to process and store voicemails and e-mails.

In another general aspect, a user interface includes a first interface element and a second interface element. The first interface element enables perception of at least one piece of received mail. The second interface element notifies a recipient of a piece of mail that the piece of mail is a bulk voicemail that includes at least some audio content that is to be made available to all recipients within a group of identified recipients.

Implementations may include one or more of the following features. For example, the second interface element may include a graphical element that distinguishes the bulk voicemail from one or more other types of received mail. The other types of received mail may include voicemails and e-mails. The graphical element may be an icon placed next to summary or title information of received pieces of mail displayed on the first interface element.

The user interface may further include a third interface element that enables the recipient to view textual contents of a bulk voicemail and play a bulk voicemail audio message in response to selection by the recipient of a link embedded in the textual contents. The third interface element may be enabled in response to selection by the recipient of the second interface element.

In another general aspect, a user interface includes four interface elements. A first interface element enables a user to input textual contents of a bulk voicemail. A second interface element enables a user to identify voicemail recipients from among a group of voicemail recipients by accessing a data store configured to store targeting data related to the group of voicemail recipients. A third interface element enables a user to specify an audio message that includes at least some audio content that is to be made available to all recipients within the group of identified voicemail recipients. A fourth interface element enables a user to send the a bulk voicemail to the identified voicemail recipients. The bulk voicemail includes the textual contents and the audio message.

The details of one or more implementations are set forth in the accompanying drawings and the description below. Other features will be apparent from the description and drawings, and from the claims.

DETAILED DESCRIPTION

Figure 1:
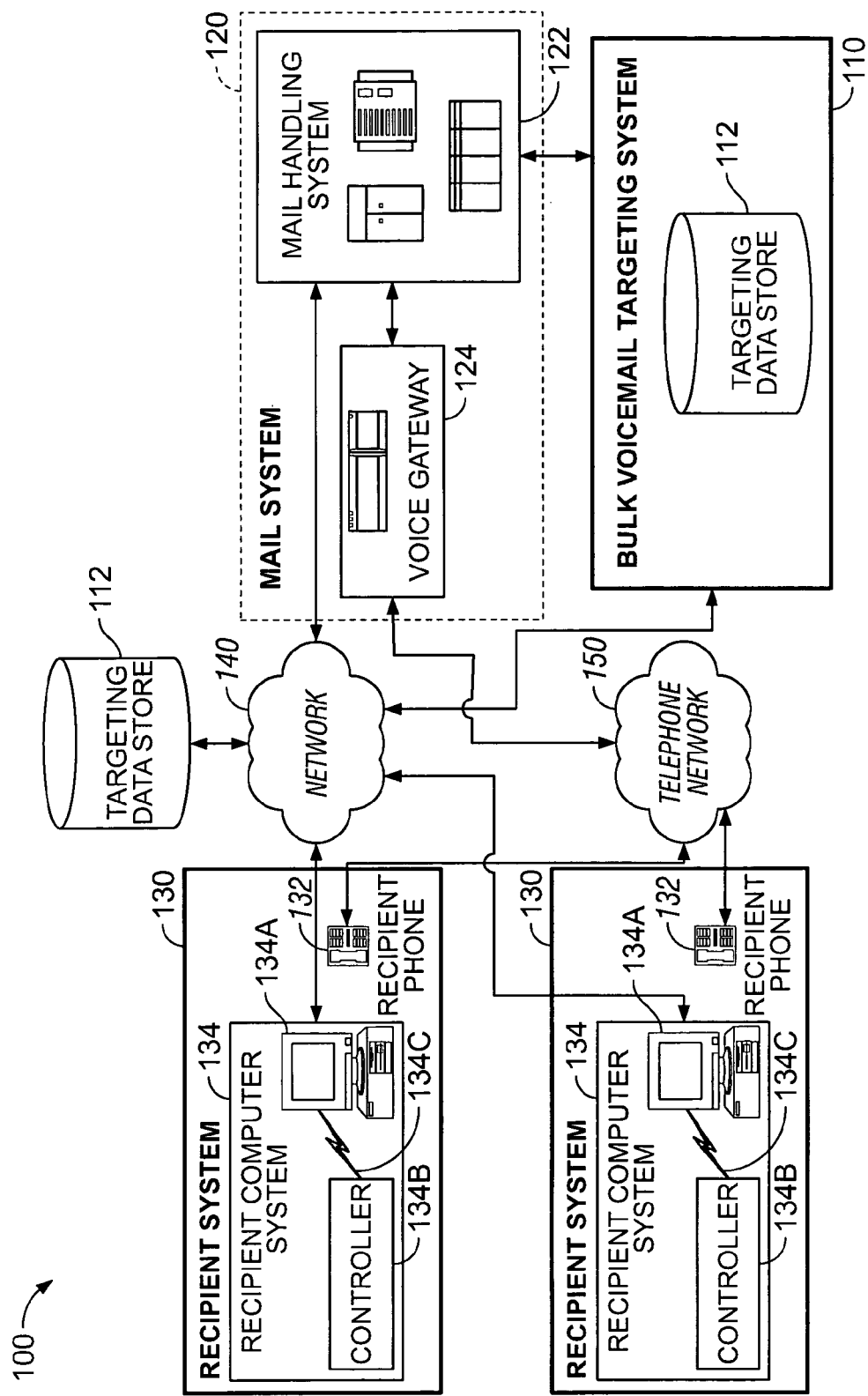
FIG. 1 is a block diagram illustrating a communications system capable of generating, delivering, and storing bulk voicemails.

Communications systems that integrate voicemail and e-mail service functionality may be designed to provide flexible voicemail services to customers. One such voicemail service that may be offered to customers is the ability to send bulk voicemails.

Bulk voicemails are voicemails sent to a group of identified or "targeted" recipients. Bulk voicemails include at least some audio content that is presented to all recipients within a group of potential voicemail recipients. In one implementation, a bulk voicemail includes a digital file, similar to a modified e-mail, with a header section, a contents (i.e., textual contents) section, and an attachments section. The attachments section includes an audio file attachment that contains an audio message from the sender to the bulk voicemail recipients.

A bulk voicemail targeting system enables users to create a bulk voicemail, address the bulk voicemail to a group of recipients, and deliver the bulk voicemail to a mail system. The group of recipients may be selected by manually identifying each recipient, selecting an identified group of recipients from among multiple identified groups, and/or identifying the group by performing a query of one or more data stores.

Bulk voicemails may be used as a vehicle to offer new services to customers. For example, a customer may register (actively or passively) for a bulk voicemail subscription service that regularly deposits bulk voicemails related to topics of interest in the mailbox of the customer. In one exemplary implementation, a customer purchases a bulk voicemail subscription to receive a track or a set of tracks of classic rock or jazz music by one or more particular artists every month. In another exemplary implementation, a customer purchases a bulk voicemail subscription to receive daily news, such, as for example, daily weather information, daily sports highlights, and/or daily local, national, or international news highlights. In yet another exemplary implementation, a customer purchases a bulk voicemail subscription to receive literary or spiritual content such as a poetry reading or a reading from the Bible every morning. In still another exemplary implementation, a customer purchases a bulk voicemail subscription as part of an online game (e.g., an interactive mystery game in which voicemail clues are deposited at regular intervals). In still another exemplary implementation, a customer purchases or otherwise receives a bulk voicemail subscription to receive advertising or promotional content related to goods or services of potential interest to the customer.

Bulk voicemails also may be used as an alternative channel or mode of communication between users otherwise configured to communicate using resources/paradigms not primarily used or designed for voice communications. For example, a user may send a bulk voicemail to members of a buddy list, members of an e-mail list, or members of a chat group (e.g., a pastor may send a bulk voicemail to members of a congregation e-mail list to inform the congregation that services have been cancelled due to snow).

Bulk voicemails may be used to improve interactions between an enterprise and its customers. For example, an enterprise may send a bulk voicemail containing customer service announcements, product update information, or product news information to customers that have purchased, adopted, or subscribed to a particular product (e.g., a broadband access provider may send bulk voicemails to customers receiving service in a part of the network that is currently experiencing data transmission problems or outages).

Bulk voicemails also may be used as a marketing tool. Groups of users that have been identified as having a particular characteristic may receive bulk voicemails related to products or services that may be of interest of users possessing that characteristic. Bulk voicemails thus offer another channel of communication to enterprises to provide promotional material to current or potential customers. To prevent the voicemail equivalent of spamming from occurring, access to the bulk voicemail targeting system may be restricted, for example, to trusted sources.

Referring to FIG. 1, a communications system 100 capable of generating, delivering, and storing bulk voicemails includes a bulk voicemail targeting system 110, a mail system 120, recipient systems 130, a network 140, and a telephone network 150. The bulk voicemail targeting system 110 generates, addresses to recipients, and delivers bulk voicemails to the mail system 120.

The mail system 120 includes a mail handling system 122 that receives and stores the bulk voicemails and a voice gateway 124. The mail handling system 122 enables users of recipient systems 130 to access the stored bulk voicemails through network 140 and/or through telephone network 150 using the voice gateway 124. The mail handling system 122 and the voice gateway 124 also may offer general e-mail and voicemail services to users of client systems, such as users of recipient systems 130. Users of recipient systems 130 may access bulk voicemails stored in the mail handling system 122 using a recipient phone 132 and/or a recipient computer system 134.

More particularly, the bulk voicemail targeting system 110 is a computer system configured to generate, address, and deliver bulk voicemails to the mail handling system 122. The bulk voicemail targeting system 110 enables a user to generate a bulk voicemail that includes a header section, a contents section having, for example, textual contents analogous to the contents of an e-mail and an attachments section containing an audio file that stores an audio message directed to the recipients of the bulk voicemail.

The bulk voicemail targeting system 110 enables a user to address the bulk voicemail message by enabling the user to directly or indirectly input a user identifier for each voicemail recipient. The user identifier may be, for example, an e-mail address or a screen name. The user may directly input user identifiers for each voicemail recipient by, for example, typing the user identifiers into an address field and/or selecting the user identifiers from a drop-down list.

The user may indirectly input user identifiers in two ways. First, the user may identify one or more common characteristics of the voicemail recipients and query one or more data stores to obtain the user identifiers of potential voicemail recipients possessing the one or more characteristics. The query of the data stores generally involves a query that is more or different than simply accessing an address group from a typical address data store (e.g., Joe's study group).

Second, the user may select a predefined group of voicemail recipients from among a set of predefined groups, where each predefined group includes user identifiers of potential recipients that share one or more common characteristics. Again, the selection contemplated generally is more or different than simply selecting a predefined address group.

Examples of data related to characteristics of potential voicemail recipients that may be used for addressing a bulk voicemail include: (1) demographic data (e.g., age, sex, race, and household income), (2) address information, (3) information related to the personal interests of users (e.g., interested in hunting, baseball, and diabetes research), (4) information related to the online social interactions of the user (e.g., the user is a member of a buddy list, a member of a chat group, or a member of an e-mail list), (5) information related to computer systems used by the user (e.g., owns a Hewlett Packard® computer with an Intel® 1.5 GHz Pentium chip running Microsoft Windows XP™, owns a Palm Pilot III™, and runs Microsoft Excel Version 2.1), (6) information related to computer systems used by the user to access the bulk voicemail system (e.g., the software used to access the bulk voicemail system), (7) information related to online services received by the user (e.g., the user is receiving premium e-mail and voicemail services, the user is subscribing to an online music service or an online news service, or the user is subscribing to an online game), (8) information related to products or services received or purchased by the user (e.g., the user is buying products or services related to weddings or the user is receiving broadband cable access), and (9) information related to products or services identified as desirable to the user (e.g., the user likes antique model trains).

The data related to characteristics of potential voicemail recipients may be collected in a variety of different ways. For example, the data may have originated as information supplied or otherwise offered directly by the voicemail recipients (e.g., in response to a web-based questionnaire or during service set-up or registration). The data related to characteristics of potential voicemail recipients also may have originated as information gathered from monitoring the actions of the potential voicemail recipient (e.g., monitoring the types of purchases made by the potential recipient, the types of web-sites visited, and the selections made in a given web-site). The data related to the characteristics of the recipient system 130 of the potential voicemail recipient may have originated as data gathered using remote system detection methods (e.g., remote testing methods to detect the processing characteristics of a remote system, the software running on the remote system, and the bandwidth of the communication channel of the remote system).

The voicemail targeting system 110 may include one or more targeting data stores 112 that store data related to the characteristics of potential voicemail recipients. The targeting data stores 112 may be local to the voicemail targeting system 110 or remote from the voicemail targeting system 110 and accessible over the network 140. The targeting data stores 112 may be standalone devices or they may be part of larger computer systems that are configured to allow the voicemail targeting system 110 to directly or indirectly access the data storage devices. The targeting data stores may be indexed in such a manner that a user of the targeting system 110 may query the data stores 112 by inputting identified characteristics of potential voicemail recipients and, in response, receive or otherwise obtain access to user identifiers corresponding to the potential voicemail recipients possessing those characteristics. The data stores 112 may be indexed by user identifier, or they may be indexed by other identifiers (e.g., customer ID number and full legal name) that are related to user identifiers. In one implementation, the targeting data stores 112 are part of computer systems unaffiliated with the voicemail targeting system 110 or voicemail service provider. In another implementation, the targeting data stores 112 include registration or customer information data stores of the voicemail service provider or of other online service providers (e.g., an online service provider of news content or of music content).

The mail handling system 122 of the mail system 120 is a computer system configured to receive bulk voicemails from the bulk voicemail targeting system 110, store the bulk voicemails, and enable the recipient systems 130 to access the bulk voicemails. The mail handling system 122 also may receive, store, and enable access to both voicemails and e-mails while providing general voicemail services and e-mail services to recognized users of client systems such as, for example, users of recipient systems 130. These services include providing recognized users with the ability to compose and organize voicemails/e-mails and the ability to send voicemails/e-mails to and receive voicemails/e-mails from other users across the network 140 and/or the telephone network 150. In another implementation, the mail handling system 122 may be configured to enable users of recipient systems 130 access only to bulk voicemails, while not providing other voicemail-related or e-mail-related services (e.g., a PDA with MP3 capabilities may access the mail handling system 122 each month solely to receive bulk voicemails containing several songs sent to music voicemail subscribers).

The voice gateway 124 of the mail system 120 is a gateway that receives user calls from recipient phones 132 through the telephone network 150 and responds to the calls in accordance with a voice program. The voice program may be accessed from local memory within the voice gateway 124 or from an application system (not shown) communicatively coupled to the voice gateway 124. In some implementations, the voice gateway 124 processes voice programs that are script-based voice applications. The voice program, therefore, may be a script written in a scripting language such as, for example, voice extensible markup language (VoiceXML) or speech application language tags (SALT). In other implementations, the voice gateway 124 and the voice program are part of an interactive voice response (IVR) system.

The voice program provides the user of the recipient phone 132 with access to bulk voicemails addressed to the user and stored in the mail handling system 122. The voice program may direct the voice gateway 124 to access the attached audio file of the bulk voicemail, convert the audio file to audio, and present the audio to the user over the recipient phone 132. Additionally, the voice program may provide general voicemail services including, for example, recording and storing greetings, playing voicemails (e.g., select a voicemail for playback, fast forward, skip, and rewind), deleting voicemails, communicating the number and status of different types of voicemails (e.g., old voicemails, new voicemails, time received, and length of voicemail), organizing voicemails (e.g., archive a voicemail and keep a voicemail tagged as new), replying to voicemails, forwarding received voicemails, and depositing voicemails. In some implementations, the voice program may use a text-to-speech module or equivalent to translate the textual contents of bulk voicemails to speech that may be heard by the user of the recipient phone 132 in addition to or as an alternative to playing the attached audio files.

The voice gateway 124 interacts with the mail handling system 122 to store, modify, and deliver voicemails in accordance with the service selections of the user of the recipient phone 132. In some implementations, the voice program uses the text-to-speech module and a speech recognition module to offer the described general voicemail services with respect to e-mails stored in the mail handling system 122.

The recipient system 130 includes a recipient phone 132 and a recipient computer system 134. The recipient computer system 134 includes a device 134A that communicates with a controller 134B over a data pathway 134C.

The recipient phone 132 is configured to exchange communications with the voice gateway 124 to enable a recipient to access bulk voicemails and, in some implementations, e-mails and/or other voicemails stored in the mail handling system 122. The recipient phone 132 may be a landline phone that allows communications over the telephone network 150. In another implementation, the recipient phone 132 may be a cellular phone or a mobile personal digital assistant (PDA) with embedded cellular phone technology.

The recipient computer system 134 is configured to receive or otherwise access bulk voicemails and, in some implementations, e-mails and/or other voicemails from the mail handling system 124 in the form of one or more digital communications. The recipient computer system includes a device 134A capable of executing instructions under the command of a controller 134B. The device 134A may be a general purpose computer, such as a workstation or a personal computer, a PDA, a special purpose computer (such as a networked MP3 player), an intelligent mobile phone, a pager, or a set top box.

The controller 134B commands and directs communications between the device 134A of the recipient system 130 and the mail handling system 122. The controller 134B may include one or more software or hardware applications that enable digital communications to be received from the mail handling system 122. For example, the controller 134B may be a voicemail application configured to receive or otherwise access bulk voicemails and other voicemails from the mail handling system 124, a mail application configured to receive or otherwise access bulk voicemails, e-mails, and other voicemails from the mail handling system 124, and/or a browser application configured to receive or otherwise access only bulk voicemails from the mail handling system 124. The device 134A is connected to the controller 134B by a wired, wireless or virtual (i.e., when the controller is software running on the device) data pathway 134C capable of delivering data.

The network 140 is configured to enable direct or indirect communications between the recipient computer system 134 and the mail handling system 122. Examples of the network 140 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

The telephone network 150 is configured to enable direct or indirect voice communications between the recipient phone 132 and the voice gateway 124. Additionally, the telephone network 150 is configured to provide general caller-related information (e.g., automatic number identification (ANI) data) to the voice gateway 124. The general caller-related information may include the phone number corresponding to the recipient phone 132, the phone number corresponding to the call origin, and the time and date when the call was initiated. In some implementations, the network 140 and the telephone network 150 are implemented by a single or otherwise integrated communications network configured to enable voice communications between the recipient phone 132 and the voice gateway 124 and to enable communications between the recipient computer system 134 and the mail handling system 122.

The telephone network 150 may include a circuit-switched voice network, a packet-switched data network, or any other network able to carry voice. For example, circuit-switched voice networks may include the public switched telephone network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

Figure 2:
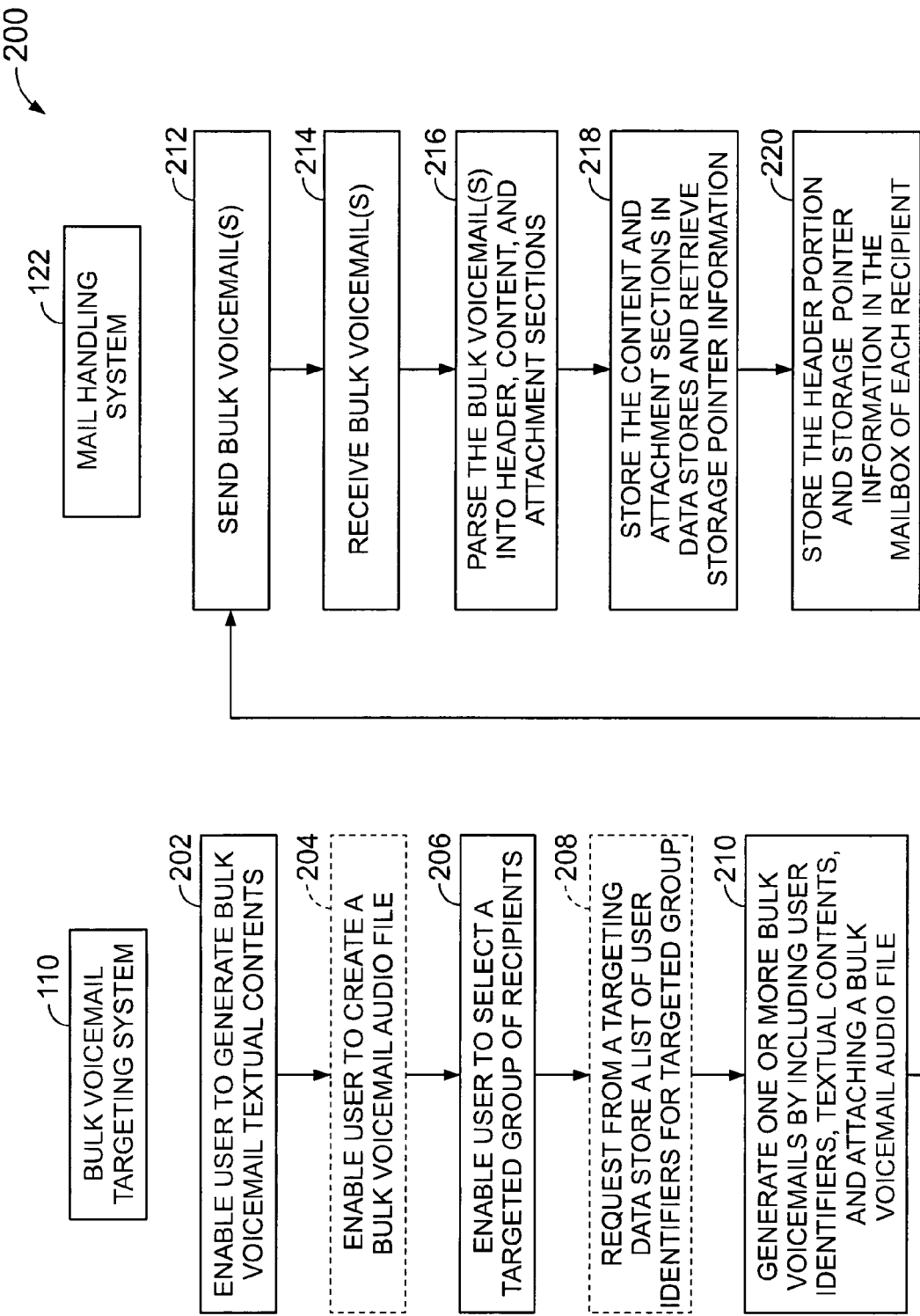
FIG. 2 is a flow chart illustrating a process for generating, delivering, and storing bulk voicemails.

FIG. 2 shows a process 200 for generating, delivering, and storing bulk voicemails. For convenience, the process 200 shown in FIG. 2 references particular componentry described with respect to FIG. 1, specifically the bulk voicemail targeting system 110 and the mail handling system 122. However, similar methodologies may be applied in other implementations where different componentry is used to define the structure of the system, or where the functionality is distributed differently among the components shown by FIG. 1.

Initially, a user of the bulk voicemail targeting system 110 generates the textual contents of a bulk voicemail (202). The textual contents of a bulk voicemail include the subject line and a message text.

The user optionally creates a bulk voicemail audio file (204). The bulk voicemail audio file may be created using known recording techniques that allow an audio message to be recorded and stored in a compact format (e.g., in an MP3 file).

The user selects a targeted group of recipients directly or indirectly (206) by, for example, manually inputting the user identifiers of the recipients, querying a targeting data store 112, and/or selecting a predefined group of voicemail recipients from among a set of predefined groups. If the user queries a targeting data store 112 or selects a predefined group of voicemail recipients, the bulk voicemail targeting system 110 sends a request to the targeting data store 112 to retrieve a list of user identifiers that correspond to the query or to the predefined group (208).

The bulk voicemail targeting system 110 generates one or more bulk voicemails as digital files similar to modified e-mails (210). The bulk voicemails are made up of a header section that includes the subject line and the recipient identifiers, a contents section that includes the message text of the bulk voicemail, and an attachments section that includes the bulk voicemail audio file. In some implementations, the header section of the bulk voicemail also includes a mail type flag. The mail type flag is used by the mail handling system 122 to identify the mail as an e-mail, a voicemail, or a bulk voicemail. The mail type flag is set to a different predetermined value depending on the type of mail. In some implementations, the mail type flag only distinguishes between two types of mail—voicemails and e-mails. The mail type flag may be implemented as an X-header when the mail transfer protocol being used is Simple Mail Transfer Protocol (SMTP).

The bulk voicemail targeting system 110 may create one or more duplicates of the bulk voicemail to optimize mail delivery and mail processing by the mail handling system 122. Each duplicate of the bulk voicemail is addressed to a subset of the targeted group of recipients. For example, if the targeted group of recipients includes 10,000 recipients, the bulk voicemail targeting system 110 may send 100 duplicate bulk voicemails. Each duplicate bulk voicemail may be addressed to 100 recipients and may include the same textual contents and bulk voicemail audio file.

The bulk voicemail targeting system 110 sends the one or more bulk voicemails to the mail handling system 122 (212). The bulk voicemail targeting system 110 uses a mail transfer protocol, such as, for example, SMTP, to send the bulk voicemails to the mail handling system 122. As an alternative to using a mail type flag in the header section of the bulk voicemail, the bulk voicemail targeting system 110 may instead modify the SMTP transaction by, for example, including additional parameters that inform the mail handling system 122 that the received mail is bulk voicemail. The mail handling system 122 is then able to distinctly process the bulk voicemails to distinguish the bulk voicemails from other types of mail (e.g., e-mails or other voicemails).

The mail handling system 122 receives the bulk voicemails (214) and parses the bulk voicemails into header, content, and attachment sections (216). The mail handling system 122 stores the content and attachment sections in data stores and retrieves storage pointer information (218). The mail handling system 122 then stores the header section and storage pointer information in a mailbox of each recipient (i.e., a storage area in which the mail of each user is stored) (220). The bulk voicemails may then be retrieved by the recipients using the mail system 120.

Figure 3:
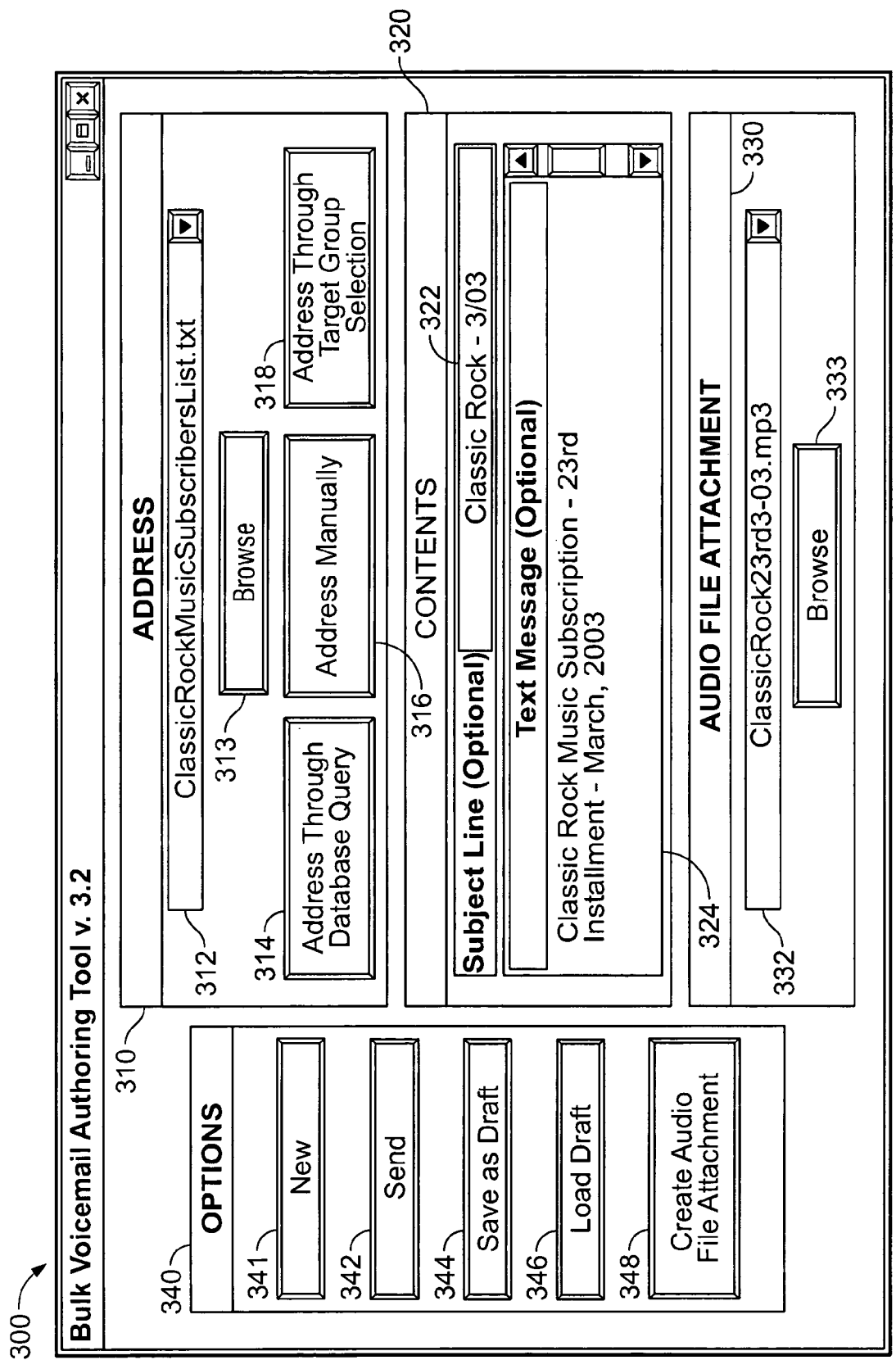
FIGS. 3-5 are diagrams of exemplary user interfaces.

As shown in FIG. 3, a bulk voicemail targeting system user interface 300 includes an address section 310, a contents section 320, an audio file attachment section 330, and an options section 340. The address section 310 is a section or window that allows a user to identify the group of bulk voicemail recipients and address the bulk voicemail appropriately. The address section 310 includes an address file field 312. A user may input a name and, in some implementations, a path of an address file into the address file field 312. An address file is a file that contains a user identifier for each recipient of the bulk voicemail. The user may use a keyboard or equivalent to manually type the name of the address file into the address file field 312 or instead may select the name of the address file from a drop-down menu. The drop-down menu may include recently-used address file names or may include a predetermined set of address file names. Alternatively, the user may select a browse button 313 to browse a data store directory structure to find and select the address file.

The address section 310 also includes addressing buttons that are selected by a user to generate an address file or otherwise determine the targeted group of bulk voicemail recipients. In the illustrated implementation, the three addressing buttons include an "address through database query" button 314, an "address manually" button 316, and an "address through target group selection" button 318. The "address through database query" button 314 may be selected to enable a user to query a targeting data store 112 to retrieve a list of user identifiers that correspond to users that meet specific criteria as set forth by the user in one or more data store queries. The resulting list of user identifiers is subsequently stored in an address file under a name that automatically appears in the address file field 312 upon conclusion of the database query operations.

The "address manually" button 316 may be selected to manually create an address file or edit a list of user identifiers in an already existing address file. If no address file name appears in the address file field 312, then selection of the "address manually" button 316 enables a user to create a new address file. The user creates a new address file by typing in or otherwise selecting individual user identifiers to generate a list of user identifiers and subsequently saving the list under a new address file name. If an address file name appears in the address file field 312, then selection of the "address manually" button 316 enables a user to edit the list of user identifiers stored in the address file and subsequently save the list under the same address file name or under a new address file name.

The "address through target group selection" button 318 may be selected to choose a group of user identifiers from among a set of groups. Selecting the button 318 may display a menu listing numerous groups by name (e.g., the menu may contain (1) hunting aficionados; (2) classic rock subscribers; (3) classic jazz subscribers; (4) poetry reading subscribers; and (5) teenager customers). When a user chooses a group, an address file corresponding to that group appears in the address file field 312.

The contents section 320 is a section or window that allows a user to input the textual contents of the bulk voicemail. The contents section 320 includes a subject line field 322 and a message text field 324. A user may optionally input a subject heading for the bulk voicemail into the subject line field 322. The subject heading corresponds to the subject heading of an e-mail that is typically displayed when a recipient uses the recipient computer system 134 to access the received bulk voicemail and/or to obtain a list of received mail. The user also may optionally input a message text. The message text corresponds to the body of an e-mail that is typically displayed when a recipient accesses the bulk voicemail using the recipient computer system 134. The message text may include encoded text formatted as hypertext transfer markup language (HTML), which may be accessed and displayed using, for example, an HTML-compatible mail application.

The audio file attachment section 330 is a section or window that enables a user to identify the audio file that contains the audio message which will be sent to the bulk voicemail recipients. The audio file attachment section 330 includes an audio file field 332. A user may input a name and, in some implementations, a path of an audio file into the audio file field 332. The user may use a keyboard or equivalent to manually type the name of the audio file into the audio file field 332 or instead may select the name of the audio file from a drop-down menu. The drop-down menu may include recently-used audio file names or may include a predetermined set of audio file names. Alternatively, the user may select the browse button 333 to browse a data store directory structure to find and select the audio file.

The options section 340 is a section or window that includes a number of buttons that correspond to general options related to the generation and delivery of bulk voicemails. The options section 340 includes a "New" button 341 which may be selected to create a new bulk voicemail. Selecting the "New" button 341 clears or sets to a default name the address file field 312 and the audio file field 332, and clears the subject line field 322 and the message text field 324.

The options section 340 also includes a "Send" button 342 which may be selected to send a bulk voicemail that includes a header section, a contents section, and an attachments section. The header section includes general header information comparable to that of an e-mail with a subject line corresponding to the text displayed in the subject line field 322 and an address portion containing the user identifiers stored in the address file named in the address file field 312. The contents section includes the message text displayed in the message text field 324. The attachments section includes the audio file named in the audio file field 332.

The options section 340 also includes a "Save as Draft" button 344 and a "Load Draft" button 346. The "Save as Draft" button 344 may be selected to save the bulk voicemail information displayed in the address section 310, the contents section 320, and the audio file attachments section 330 in a bulk voicemail draft file. The "load draft" button may be selected to overwrite the information displayed in the address section 310, the contents section 320, and the audio file attachments section 330 with corresponding information stored in a selected bulk voicemail draft file.

The options section 340 also includes a "Create Audio File Attachment" button 348 which may be selected to launch an audio recording application or code module that enables a user to record an audio message and store the audio message in an audio file. The name of the audio file may then be entered into the audio file field 332 to attach the audio file to the bulk voicemail.

Figure 4:
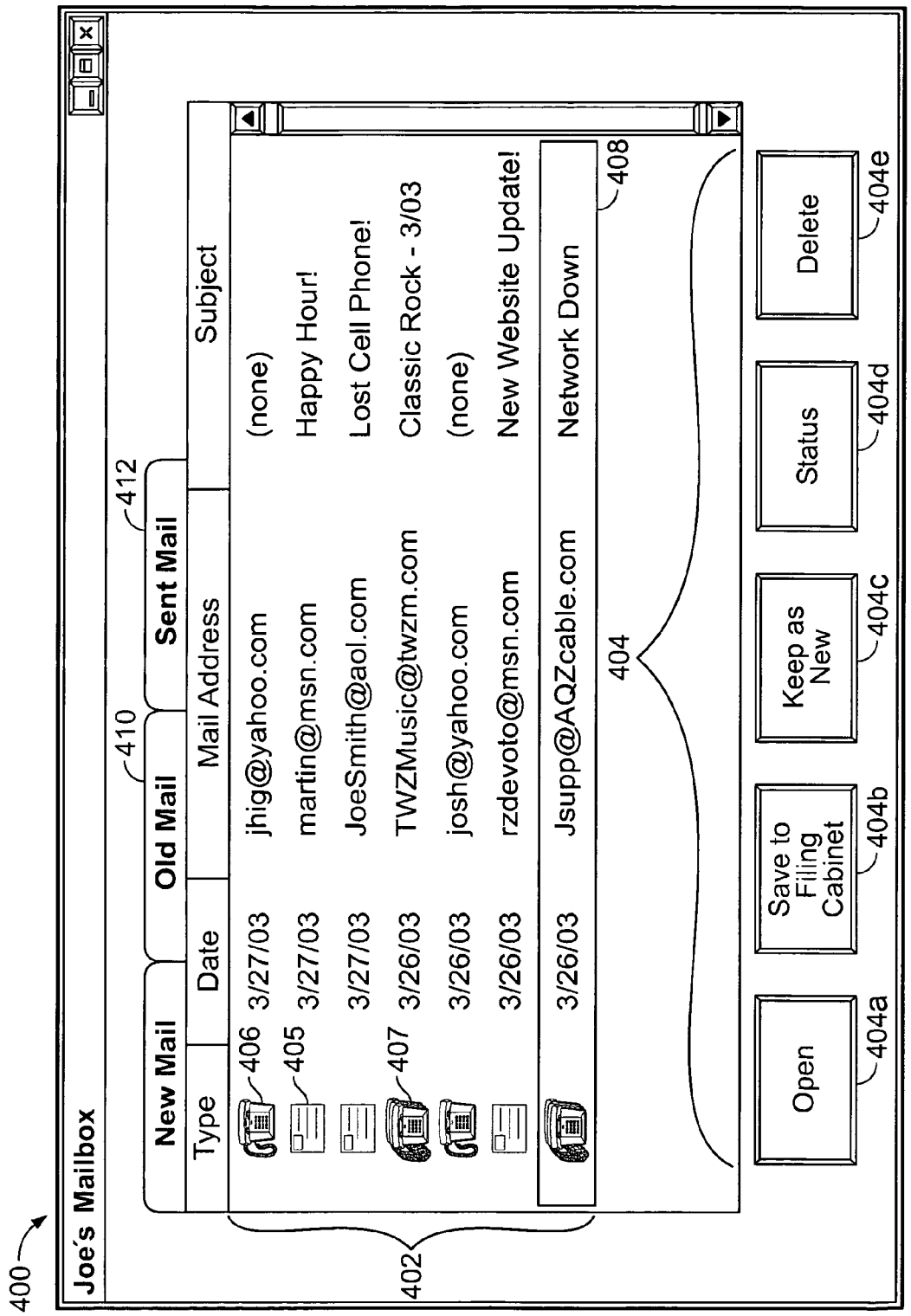

FIG. 4 shows a mail system user interface 400 that may be used by a recipient of a bulk voicemail to access bulk voicemails, voicemails, and e-mails using the recipient computer system 134. The mail system user interface 400 may be used to select an individual bulk voicemail, voicemail, or e-mail, and to display a corresponding individual mail interface 500 shown in FIG. 5. The interfaces 400 and 500 may be implemented using a client software module on the recipient computer system 134 or using a server software module in the mail system 120, and they may be perceivable using a browser interface. In some implementations, interfaces 400 and 500 may be combined into a single interface that enables control of both system-level e-mail operations and individual e-mail operations.

Referring to FIG. 4, an exemplary mail system user interface 400 includes a list 402 of mail entries containing selected portions of the header of mail recently received (i.e., new mail) and mail operation buttons 404. The type of mail represented by a given entry may be depicted by a label that may be text or that may be a graphical element (e.g., an icon). In the implementation shown, a letter icon 405 represents an e-mail, a phone icon 406 represents a voicemail, and a multiple phone icon 407 represents a bulk voicemail.

A user may select an exemplary mail entry 408 in the list 402 using an input mechanism available to the user, such as, for example, a keyboard or a mouse. A selected mail entry may be denoted as being selected by, for example, being highlighted.

Once a mail entry has been selected, the user may perform mail operations including, but not limited to: (1) opening the selected mail, (2) placing the mail in a selected folder or filing cabinet, (3) keeping the mail as new, (4) checking the status of the mail, and (5) deleting the selected mail. The user may perform these operations on the selected mail by, for example, selecting one or more graphical elements displayed in the user interface 400, such as, for example, the open button 404a, the save button 404b, the keep as new button 404c, the status button 404d, and the delete button 404e. Alternatively, the user may employ keyboard function keys, pop-up menus, and/or mouse button inputs to perform one or more of these operations. The desired operations may be implemented, for example, through the use of hyperlinks that grant access to specified directions embedded in the online service provider's network and/or through the triggering of macros or other pre-programmed algorithms.

The user interface 400 also may allow the user to access other lists similar to list 402 but containing mail entries that satisfy different criteria. For example, the user interface 400 may include an old mail tab 410 and/or a sent mail tab 412. The oil mail tab 410 and the sent mail tab 412 may be selected by a user to access lists comparable to list 402 but containing entries corresponding to old mail (i.e., read mail) and/or sent mail (i.e., mail sent by the user), respectively. In other implementations, the old mail, the sent mail, and the other lists may be accessed through selection of other graphical elements (e.g., buttons) displayed in the user interface 400 and/or through the use of keyboard function keys, pop-up menus, and/or mouse button inputs. In some implementations, additional tabs included in the interface 400 may be selected by a user to access, for example, only voicemails, only bulk voicemails, and/or only e-mails.

Figure 5:
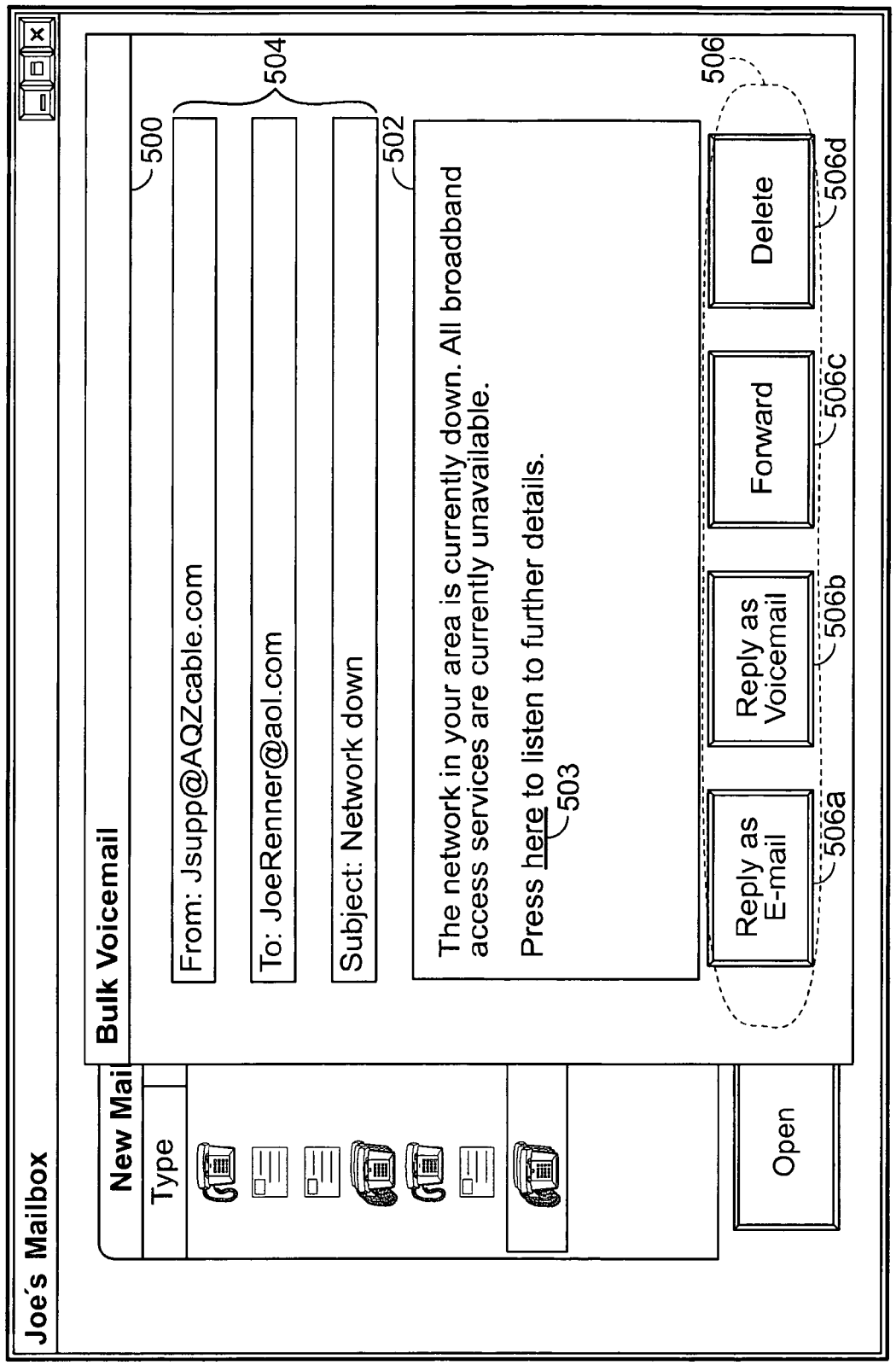

Referring to FIG. 5, when the user selects a mail entry corresponding to a piece of mail from the list 402 and selects the open button 404a or performs a similar operation to open the mail, the individual mail interface 500 is presented to the user. The individual mail interface 500 includes a display 502 of the message text of the mail, a display 504 of all or selected portions of the header section of the mail, and graphical elements or buttons 506 that enable performance of mail operations related to the selected mail.

If the mail is a bulk voicemail or a voicemail, the display 502 may contain an embedded link 503 that may be selected by the user to play the contents of an attached audio file. The attached audio file may be streamed to the user to allow playback to commence quickly and/or may be downloaded as a file and subsequently played back once the complete file is stored in the recipient computer system 130. In some implementations, the display 502 also may contain the time at which the voicemail or bulk voicemail was deposited and, if applicable, caller related information (e.g., caller telephone number, time called, and date called).

In the illustrated implementation, the buttons 506 of the individual mail interface 500 include (1) a button 506a for sending an e-mail reply to the sender of the mail, (2) a button 506b for sending a voicemail reply to the sender of the mail, (3) a button 506c for forwarding the mail, and (4) a button 506d for deleting the mail. The desired operations may be implemented, for example, through the use of hyperlinks that grant access to specified directories embedded in the online service provider's network and/or through the triggering of macros or other pre-programmed algorithms.

Figure 6A:
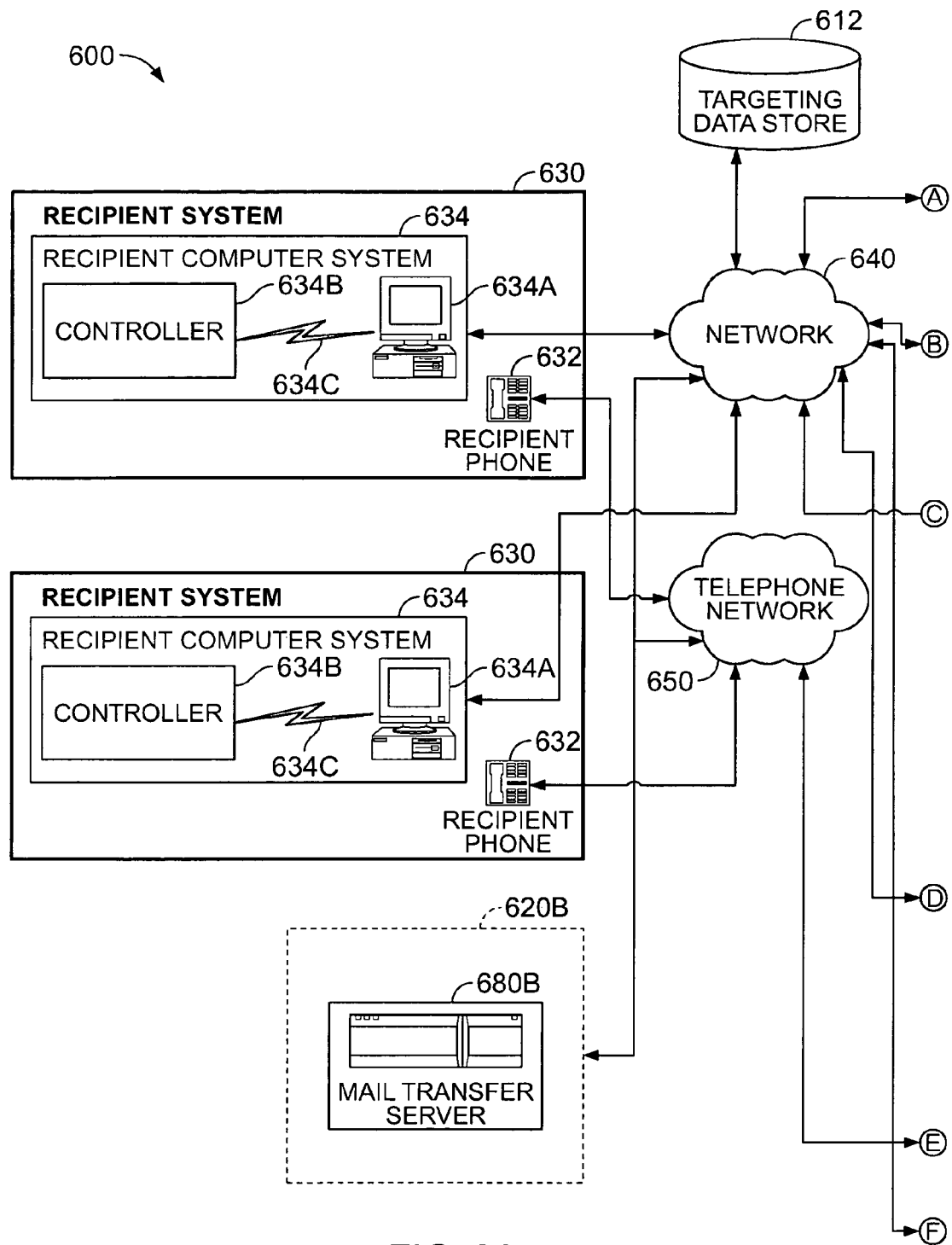
FIGS. 6A and 6B are a block diagram illustrating a particular implementation of the communications system of FIG. 1.
Figure 6B:
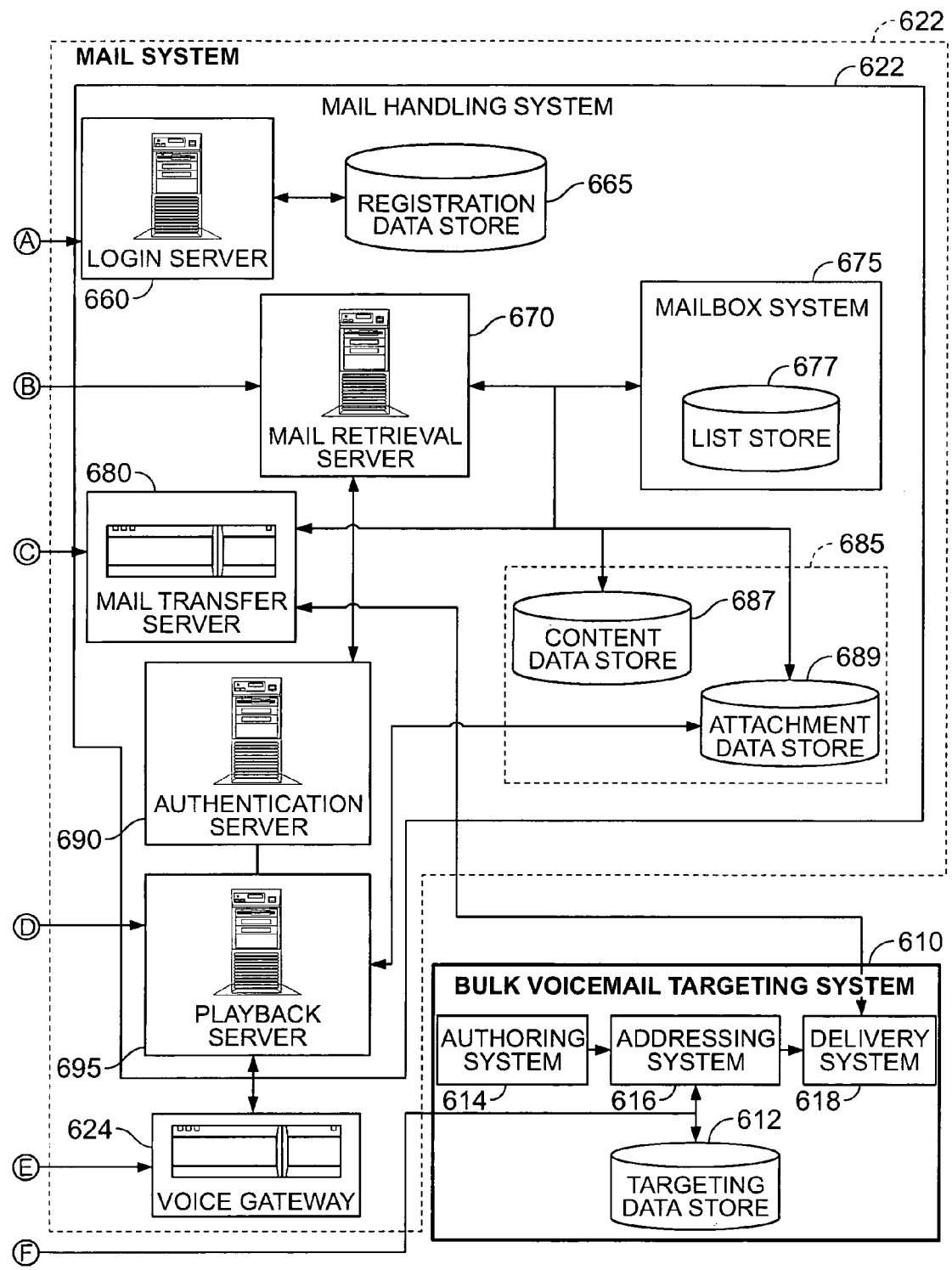

FIGS. 6A and 6B shows one exemplary implementation 600 of the communications system 100 of FIG. 1 configured to generate, deliver, and store bulk voicemails. The communications system 600 includes a bulk voicemail targeting system 610 configured to access a targeting data store 612 and to generate, address to recipients, and deliver bulk voicemails to a mail system 620. The mail system 620 includes a mail handling system 622 that receives and stores the bulk voicemails and a voice gateway 624. The mail handling system 622 provides mail services (i.e., both e-mail and voicemail services) to users of recipient systems 630.

Users of recipient systems 630 may access the stored bulk voicemails through a network 640 and/or through a telephone network 650 using the voice gateway 624. As one example, the users may use a recipient phone 632 and/or a recipient computer system 634 to access the stored bulk voicemails and receive mail services from the mail handling system 622.

Examples of each element within the system 600 of FIGS. 6A and 6B are described broadly with respect to FIG. 1. In particular, the bulk voicemail targeting system 610, the targeting data store 612, the mail system 620, the recipient systems 630, the network 640, and the telephone network 650 typically have attributes comparable to those described with respect to the bulk voicemail targeting system 110, the targeting data store 112, the mail system 120, the recipient systems 130, the network 140, and the telephone network 150 of FIG. 1.

The bulk voicemail targeting system 610 includes an authoring system 614, an addressing system 616, and a delivery system 618. The functions of the authoring system 614, the addressing system 616, and the delivery system 618 may be implemented in software or hardware within a single computer system or across multiple computer systems that are communicatively coupled to each other.

The authoring system 614 is a computer system configured to enable a user to input textual contents of a bulk voicemail, select and, in some implementations, generate a bulk voicemail audio file, and select a targeted group of recipients to receive the bulk voicemail from among a set of predetermined groups of recipients. The authoring system 614 creates a message file that includes a target group identifier, bulk voicemail textual contents, and an audio file attachment, and sends the message file to the addressing system 616. The target group identifier is an identifier such as, for example, an identification (ID) number that corresponds to a group of potential bulk voicemail recipients (e.g., ID number 1223 corresponds to recipients that have expressed an interest in hunting).

The addressing system 616 is a computer system configured to receive the message file from the authoring system 614, access from a targeting data store 612 a list of user identifiers corresponding to the target group identifier in the message file, and generate one or more addressed message files. The addressing system 616 queries the targeting data store 612 based on the target group identifier in order to retrieve the list of user identifiers corresponding to the target group identifier. Once the user identifiers list is retrieved, the addressing system 616 generates one or more addressed message files. Each addressed message file duplicates the message file received from the authoring system 614, and also includes an address portion with all or a subset of the retrieved list of user identifiers.

The number of addressed message files created by the addressing system 616 depends on the capabilities of the mail handling system 622 to process and store mail that is addressed to a large number of recipients. For example, if the bulk voicemail is being sent to 10000 recipients and the mail handling system 622 becomes overloaded when handling a piece of mail that is addressed to more than 200 recipients, then the addressing system creates 50 addressed message files in order to diminish the loading effect on the mail handling system 622.

The delivery system 618 is a computer system configured to receive the one or more addressed message files, generate a bulk voicemail for each addressed message file, and send the one or more bulk voicemails to a mail transfer server 680 of the message handling system 622. The bulk voicemail is a digital file similar to a modified e-mail that includes a header section, a contents section, and an attachments section. In this implementation, the header section includes a user identifier (e.g. name or address) corresponding to the bulk voicemail sender, all or a subset of the list of recipient user identifiers, a date and a time that the bulk voicemail was sent, and a subject to which the bulk voicemail relates. The header section also may include information relating the path taken by the bulk voicemail to arrive at its destination and the name of the authoring system application used to generate the bulk voicemail. In another implementation, the header section may include a mail type flag that indicates that the mail is a bulk voicemail.

The contents section includes the message text of the bulk voicemail. The message text is typically stored as American Standard Code for Information Interchange (ASCII) text. The message text may include ASCII text formatted as hypertext markup language (HTML) that may be accessed and displayed using, for example, an HTML-compatible mail application.

The attachments section includes the bulk voicemail audio file that contains the audio message sent to the recipients. The audio file may be encoded into ASCII text using, for example, multipurpose Internet mail extensions (MIME) or Unix-to-Unix encode (Uuencode).

The delivery system 618 uses a mail transfer protocol such as, for example, SMTP to send the bulk voicemails to the mail transfer server 680 of the mail handling system 622.

The SMTP transaction between the delivery system 618 and the mail transfer server 680 may include additional parameters that inform the mail transfer server 680 that the received bulk voicemails are bulk voicemails and not some other type of mail (e.g., e-mails or other voicemails).

The mail handling system 622 includes a login server 660 that accesses a registration data store 665, a mail retrieval server 670, a mailbox system 675, the mail transfer server 680, a mail data store 685, an authentication server 690, and a playback server 695. The mailbox system 675 includes a list store 677. The mail data store 685 includes a contents data store 687 and an attachment data store 689.

The login server 660 verifies the identity of a user of the recipient system 630 prior to allowing the user to access the mail services offered by the mail system 620. To do so, the login server 660 accesses the registration data store 665 to determine whether a given user attempting to access mail services has, in fact, been registered for such services. The login server 660 prevents users that have not been registered for mail services from accessing the mail services provided by the mail system 620.

The mail retrieval server 670 is configured to retrieve mail stored in the mail data store 685. The mail retrieval server 670 communicates with the recipient computer system 634 directly using a protocol for retrieving mail such as, for example, Internet Message Access Protocol (IMAP) or Post Office Protocol (POP). When a user accesses a bulk voicemail, the mail retrieval server 670 requests a secure Universal Resource Locator (URL) from the authentication server 690 and sends the secure URL to the recipient computer system 634 and/or to the voice gateway 624. The recipient computer system 634 and/or the voice gateway 624 uses the secure URL to access the playback server 695. The playback server 695 streams the audio file of the bulk voicemail directly to the recipient computer system 634 and/or to the voice gateway 624. The recipient computer system 634 converts the streaming audio file into audio that is presented to the user. The voice gateway also converts the streaming audio file into audio and relays the audio to the user through the recipient phone 632. Similar operations are performed when a user accesses a standard voicemail.

Generation and use of a secure URL ensures that only the proper recipient of the bulk voicemail is allowed to listen to the bulk voicemail. Streaming the audio file of the bulk voicemail improves the user experience by decreasing or eliminating the delay associated with downloading the audio file prior to playing the audio file.

The mail retrieval server 670 also may receive from the mailbox system 675 a list of the mail stored in the mail data store 685 that is available for retrieval. The mail retrieval server 670 may be, for example, a POP or IMAP server modified to communicate with the voice gateway 624 and the authentication server 690.

The mailbox system 675 keeps track of information about the mail stored in the electronic mailbox of each registered user (i.e., the storage area in which the mail of each user is stored). The mailbox system stores this information in the list store 677. The list store 677 is a data store that may include a data entry for each piece of mail in the mailbox of each user. The data entry for each piece of mail may include the header information of the piece of mail, the type of mail (i.e., voicemail, bulk voicemail, or e-mail), the mail status information (e.g., message opened or not opened), and mail data storage pointer information. The mail data storage pointer information may include one or more pointers to the locations in the mail data store 685 in which the contents and attachments of the piece of mail are stored. The list store 677 also may store other information related to the mailbox of each user, such as, for example, the size and remaining capacity of the mailbox.

The mail transfer server 680 provides the bulk voicemail targeting system 610 with the ability to send mail (i.e., bulk voicemail in particular) to other users and also provides recipient system 630 with the ability to receive mail from and send mail to other users. The mail transfer server 680 communicates with the delivery system 618 and the recipient computer system 634 using a protocol for transferring mail such as, for example, SMTP.

The mail transfer server 680 receives mail sent by the delivery system 618 and sent by the recipient system 630. If the recipient of a piece of mail sent by the delivery system 618 or by the recipient system 630 is registered for mail services with the mail system 620 (i.e., the piece of mail is addressed to a mailbox in the mail handling system 622), the mail transfer server 680 may store the piece of mail in the mailbox of the recipient. If the recipient of a piece of mail is not registered for mail services with the mail system 620 but is receiving mail services from a second and different mail system 620B in communication with the mail system 620 through the network 640 and/or the telephone network 650, the mail transfer server 680 may send the piece of mail to the mail transfer server 680B or a comparable component in the second mail system 620B associated with the recipient.

The mail transfer server 680 also receives mail from mail transfer servers 680B of other mail systems 620B. The mail transfer server 680 may store mail that is addressed to a recipient that receives mail services from the mail system 620 in the mailbox of the recipient. The mail transfer servers may be, for example, SMTP gateways.

When the mail transfer server 680 receives a piece of mail addressed to a recipient who is registered with the mail system 620, the mail transfer server 680 may communicate with the mailbox system 675 to determine whether the mailbox of the recipient is valid and whether the mailbox if full. If the mailbox of the recipient is valid and is not full, the mail transfer server 680 stores the piece of mail in the mail data store 685 and updates the data entries in the list store 677 to reflect the arrival of a new piece of mail in the mailbox of the recipient. If the mailbox of the recipient is not valid or is full, the mail transfer server 680 typically sends the piece of mail back to the sender with an appropriate error message. Sending back the piece of mail also may be referred to as bouncing the piece of mail.

The mail data store 685 stores mail data including the contents and attachments of mail received by users registered to receive mail services provided by the mail system 620. The mail data store 685 includes a content data store 687 and an attachments data store 689. The mail data store 685 sends mail data to the mail retrieval server 670 and receives mail data for storage from the mail transfer server 680. The mail data, which typically is compressed when stored, is typically decompressed by the mail data store 685 or the mail retrieval server 670 upon being retrieved. The mail data store 685 also may provide the mailbox system 675 and/or the mail transfer server 680 with mail data storage pointer information.

The authentication server 690 is configured to authenticate a request from a user to play a bulk voicemail (or voicemail) using the playback server 695. The authentication server 690 generates a secure URL at the request of the mail retrieval server 670 and sends the secure URL or otherwise allows access to the secure URL to the mail retrieval server 670. The mail retrieval server 670 sends or otherwise provides the recipient computer system 634 and/or the voice gateway 624 with access to the secure URL. The recipient computer system 634 and/or the voice gateway 624 use the secure URL to submit a streaming bulk voicemail (or voicemail) audio file request (e.g., a Hypertext Transfer Protocol (HTTP) request) to the playback server 695 to stream a selected bulk voicemail (or voicemail) audio file.

The secure URL generated by the authentication server 690 may be generated based on one or more of the following: time of the request, date of the request, user identifier (i.e., of the recipient), audio file storage pointer information, and the Internet Protocol (IP) address of the authentication server 690. Secure URLs are only generated by the authentication server 690 at the request of a trusted mail retrieval server 670. To further enhance security, the secure URL may be time-sensitive such that, after a predetermined amount of time, requests using the secure URL are no longer authenticated by the authentication server 690 when submitted for authentication by the playback server 695 (e.g., a secure URL may be valid for only 30 seconds after the generation of the secure URL).

The playback server 695 is configured to access the audio file of a selected bulk voicemail (or voicemail) and stream the audio file to the recipient computer system 634 and/or to the voice gateway 624. Upon receiving a streaming audio file request from the recipient computer system 634 or from the voice gateway 632, the playback server 695 sends an authentication request to the authentication server 690 to verify that the received streaming request is a valid request initiated by the owner of the mailbox in which the selected bulk voicemail (or voicemail) is stored. The authentication server 695 examines the secure URL used in the streaming audio file request and determines whether to authenticate the streaming audio file request. The playback server 695 receives the authentication and, if the request was authenticated, accesses the attachment data store 689 and begins streaming the appropriate audio file to the recipient computer system 634 or to the voice gateway 624.

A user of the recipient system 630 typically is registered prior to accessing the mail services provided by the mail system 620. The registration process includes generating a configuration file for the user. The configuration file includes the user identifier assigned to the user. The configuration file also may include a password that is provided by the user each time the user wants to access the mail services provided by the mail system 620. The user configuration files may be stored in the registration data store 665.

When a user wants to access the mail services provided by the mail system 620, the user launches or executes a mail application that communicates with the login server 660. The user may log into the mail system 620 by providing his or her user identifier and his or her password. The login server 660 verifies that the user identifier and associated password correspond to a user identifier and associated password stored in the registration data store and registered to receive mail services.

Figure 7A:
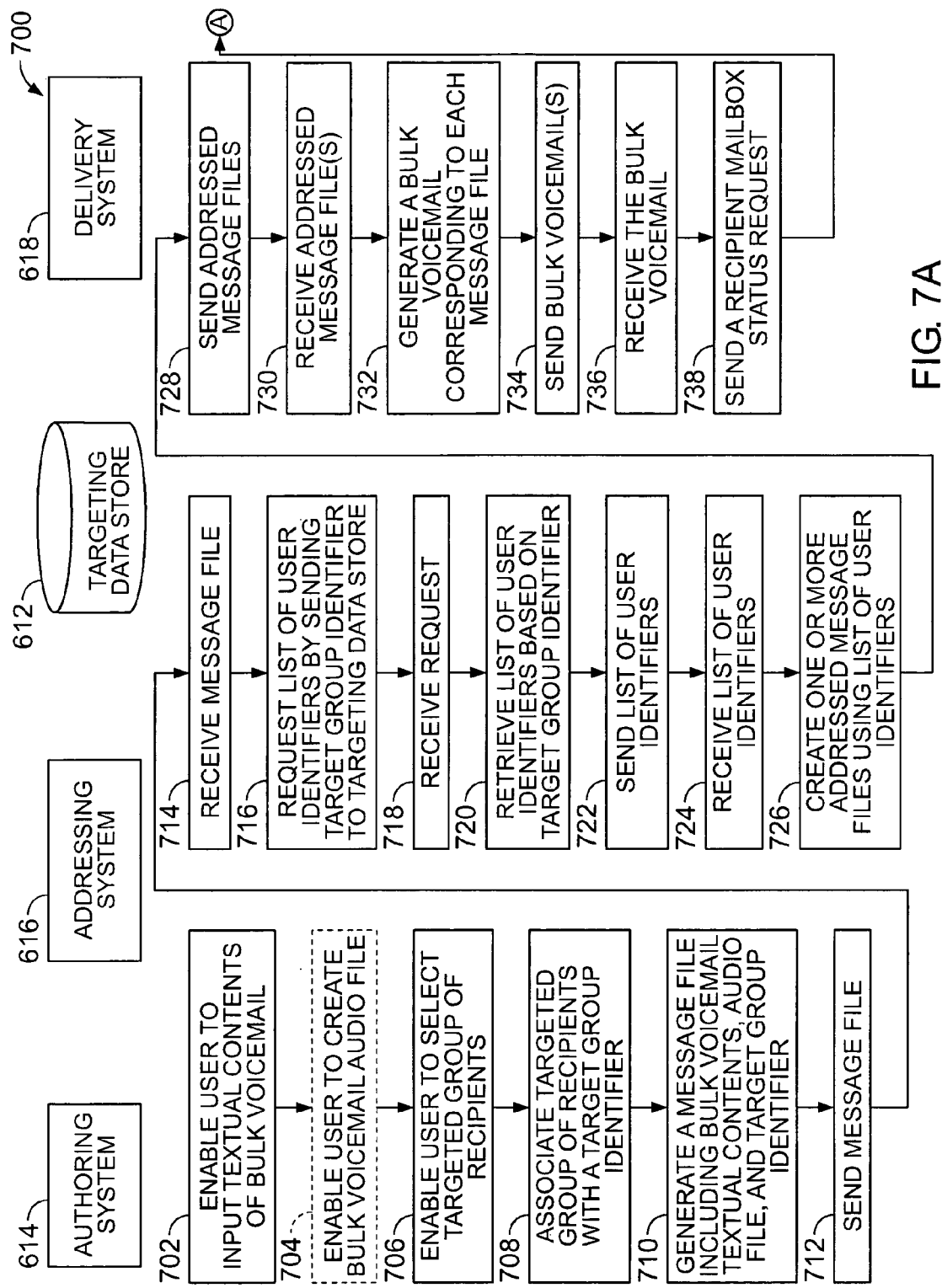
FIGS. 7A and 7B are a flow chart illustrating a process for generating, delivering, and storing bulk voicemails using the communication system of FIGS. 6A and 6B.
Figure 7B:
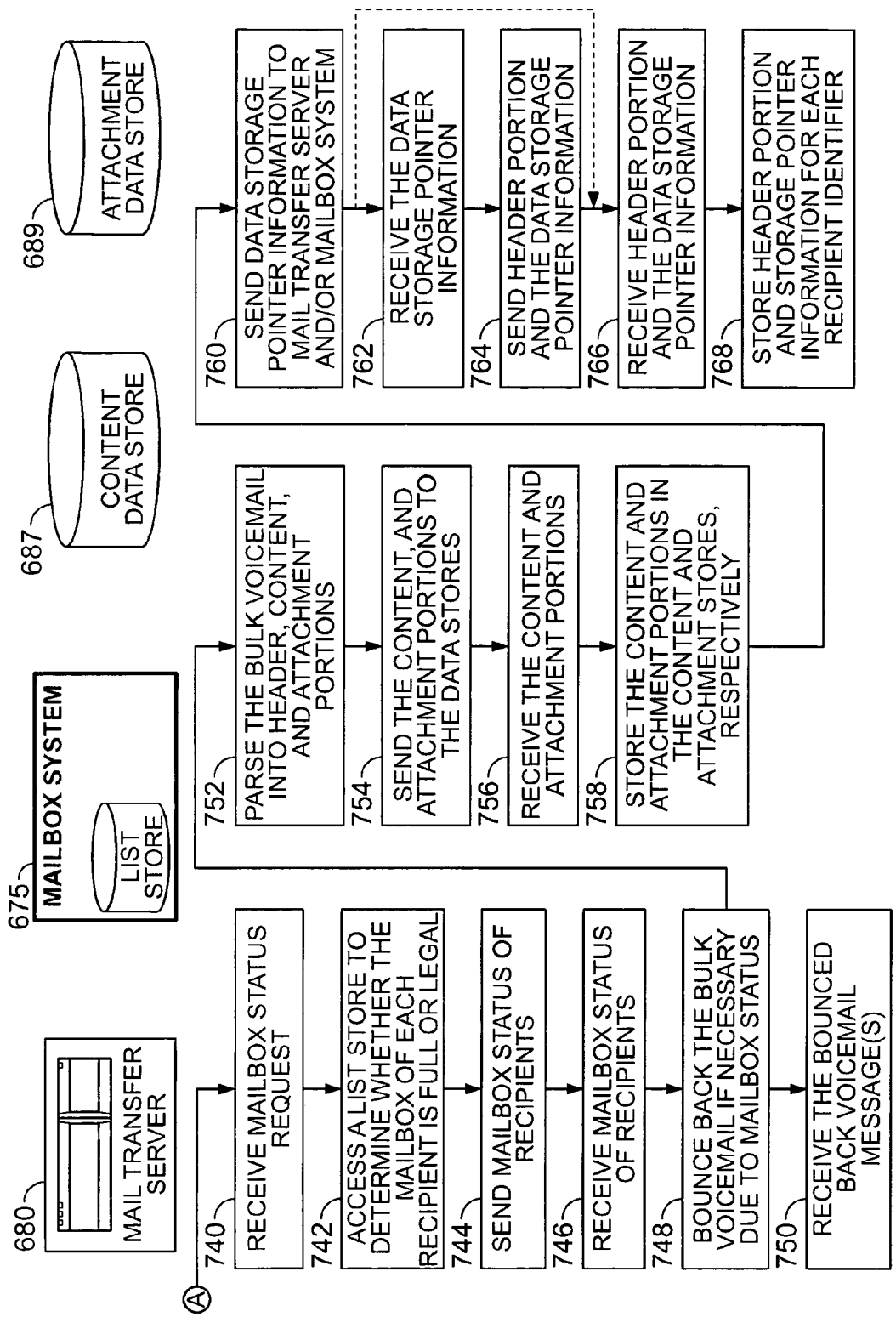

FIGS. 7A and 7B shows a process 700 for generating, delivering, and storing bulk voicemails. For convenience, particular components described with respect to FIGS. 6A and 6B are referenced as performing the process 700. However, similar methodologies may be applied in other implementations where different components are used to define the structure of the system, or where the functionality is distributed differently among the components shown by FIGS. 6A and 6B.

A user of the authoring system 614 generates the textual contents of a bulk voicemail (702) and optionally creates a bulk voicemail audio file (704). The user selects the targeted group of recipients from among a set of predefined groups (706).

The authoring system 614 associates the selected targeted group with a target group identifier (708) and generates a message file that includes the bulk voicemail textual contents, audio file, and target group identifier (710). The authoring system 614 sends the message file or otherwise makes the message file accessible to the addressing system 616 (712).

The addressing system 616 receives or otherwise accesses the message file (714) and sends a request for a list of user identifiers to the targeting data store 612 (716). The request sent to the targeting data store 612 includes the target group identifier.

The targeting data store receives the request (718) and retrieves a list of user identifiers based on the target group identifier (720). The list of user identifiers is sent or otherwise made accessible to the addressing system 616.

The addressing system 616 receives or otherwise accesses the list of user identifiers (724) and creates one or more addressed message files using the list of user identifiers in the manner discussed previously (726). The addressed message files are sent or otherwise made accessible to the delivery system 618.

The delivery system 618 receives or otherwise accesses the addressed message files (730) and generates a bulk voicemail corresponding to each message file in the manner discussed previously (732). The delivery system 618 sends the bulk voicemail(s) to the mail transfer server 680 (734).

The mail transfer server 680 receives the bulk voicemail from the delivery system 618 (736). The mail transfer server 680 sends a status request to the mailbox system 675 to determine the status of the mailbox of each recipient of the bulk voicemail (738). For simplicity, the process 700 assumes that all bulk voicemail recipients have mailboxes in the mail system 620. In other implementations, the mail transfer server 680 may need to deliver the bulk voicemail to other mail transfer servers 680B of other mail systems 620B if any of the recipients of the bulk voicemail have mailboxes in other mail systems.

The mailbox system 675 receives the mailbox status request from the mail transfer server 680 (740) and accesses the list store 677 to determine whether the mailbox of the recipient is full or legal (742). The mailbox system 675 returns the mailbox status of the recipient to the mail transfer server 680 (744).

The mail transfer server 680 receives the status of the mailbox of the recipient (746) and, when appropriate based on the mailbox status, bounces back (i.e., returns to the sender) the bulk voicemail (748). For example, if the mailbox of the recipient is full or if the mailbox of the recipient is no longer legal (e.g., the mailbox has been frozen because of the behavior of the recipient), the bulk voicemail is bounced back. When the mail transfer server 680 bounces back a bulk voicemail, the mail transfer server 680 changes the recipient address to that of the sender, optionally adds information regarding the reason why the bulk voicemail is being bounced back, and handles the bulk voicemail like any other piece of mail that is sent to a client system (750).

If the mailbox of the recipient is legal and is not full, the mail transfer server 680 parses the bulk voicemail into a header section, a contents section, and an attachment section (752). The mail transfer server 680 then sends the contents and attachment sections of the bulk voicemail to the mail data store 685 (754).

The mail data store 685 receives the contents and the attachment sections of the bulk voicemail (756) and stores them in the content data store 687 and the attachment data store 689 (758). The mail data store 685 sends data storage pointer information or otherwise makes the data storage pointer information accessible to the mail transfer server 680 and/or to the mailbox system 675 (760).

The bulk transfer server 680 receives or otherwise accesses the data storage pointer information from the mail data store 685 (762) and sends the header portion of the bulk voicemail and the data storage pointer information to the mailbox system 675 (764).

The mailbox system 675 receives the header portion from the mail transfer server 680 and receives the data storage pointer information from the mail transfer server 680 and/or from the mail data store 685 (766). The mailbox system 675 stores the header portion and the data storage pointer information in the list store 677 in a mail data entry corresponding to the mailbox of the recipient (768).

Figure 8:
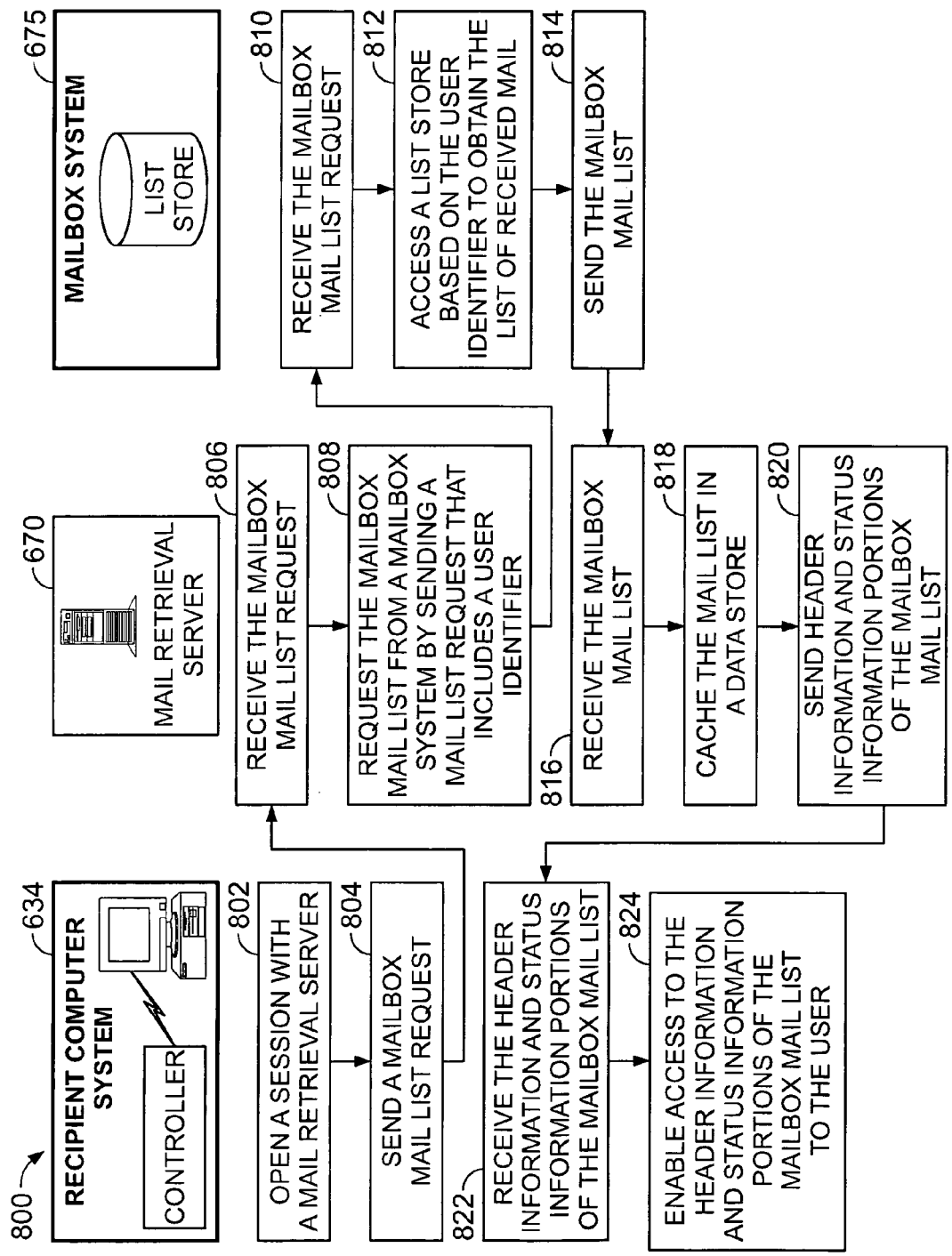
FIG. 8 is a flow chart illustrating a process for enabling a user to perceive a list of received mail using a recipient computer system.

FIGS. 8-11A and 11B illustrate processes that enable users of the recipient systems to access bulk voicemails stored in a mail handling system. FIGS. 8 and 10A and 10B show processes that enable a user of a recipient system to access received bulk voicemails from a list that also may include received voicemails and e-mails. FIGS. 9A and 9B and 11A and 11B show processes that enable a user of a recipient system to select a bulk voicemail or voicemail from the list and play the bulk voicemail or voicemail. For convenience particular components described with respect to FIGS. 6A and 6B are described as implementing the processes shown in FIGS. 8-11A and 11B. However, similar methodologies may be applied in other implementations where different components are used to define the structure of the system, or where the functionality is distributed differently among the components shown by FIGS. 6A and 6B.

FIG. 8 shows a process 800 for enabling a user to perceive a list of received mail (i.e., bulk voicemail, voicemail, and e-mail) using a recipient computer system 634. After launching a mail application and logging into the mail handling system 622, the recipient computer system 634 opens a session with the mail retrieval server 670 (802) and sends a mailbox mail list request to the mail retrieval server 670 (804). The mailbox mail list request may include the user identifier of the user of the recipient system 634.

The mail retrieval server 670 receives the mailbox mail list request from the recipient computer system 634 (806) and requests the mailbox mail list from the mailbox system 675 (808). The mail retrieval server 670 may receive an identifier of the user of the recipient system 634 from either the login server 660 or from the recipient computer system 634. The mailbox mail list request typically includes the user identifier of the user of the recipient system 634.

The mailbox system 675 receives the mailbox mail list request from the mail retrieval server 670 (810), accesses the list store 677 to obtain the mailbox mail list that corresponds to the user identifier (812), and sends the mailbox mail list to the mail retrieval server 670 (814). The mailbox mail list includes some or all of the data entries corresponding to mail (i.e., bulk voicemails, voicemails, and e-mails) stored in the mailbox of the user. The data entries for each piece of mail include header information (including mail type), status information, and data storage pointer information.

The mail retrieval server 670 receives the mailbox mail list from the mailbox system 675 (816) and caches the mailbox mail list (818). The mail retrieval server 670 sends or otherwise makes the header information and the status information of the data entries of the mailbox mail list accessible to the recipient computer system 634 (820).

The recipient computer system 634 receives the header information and the status information of the data entries in the mailbox mail list from the mail retrieval server 670 (822) and enables the user of the recipient computer system 634 to access the header and status information of the data entries in the mailbox mail list (824). The mail application of the recipient computer system 634 may, for example, allow the user to access the header and status information of the mailbox mail list by displaying the information in a list on a computer screen (e.g., list 402 of FIG. 4). The user of the recipient computer system 634 may thus perceive the list of e-mails, voicemails, and bulk voicemails sent to the user by simply viewing the computer screen. The user may open a received piece of mail by simply selecting the data entry corresponding to the received piece of mail from the perceived list.

Figure 9A:
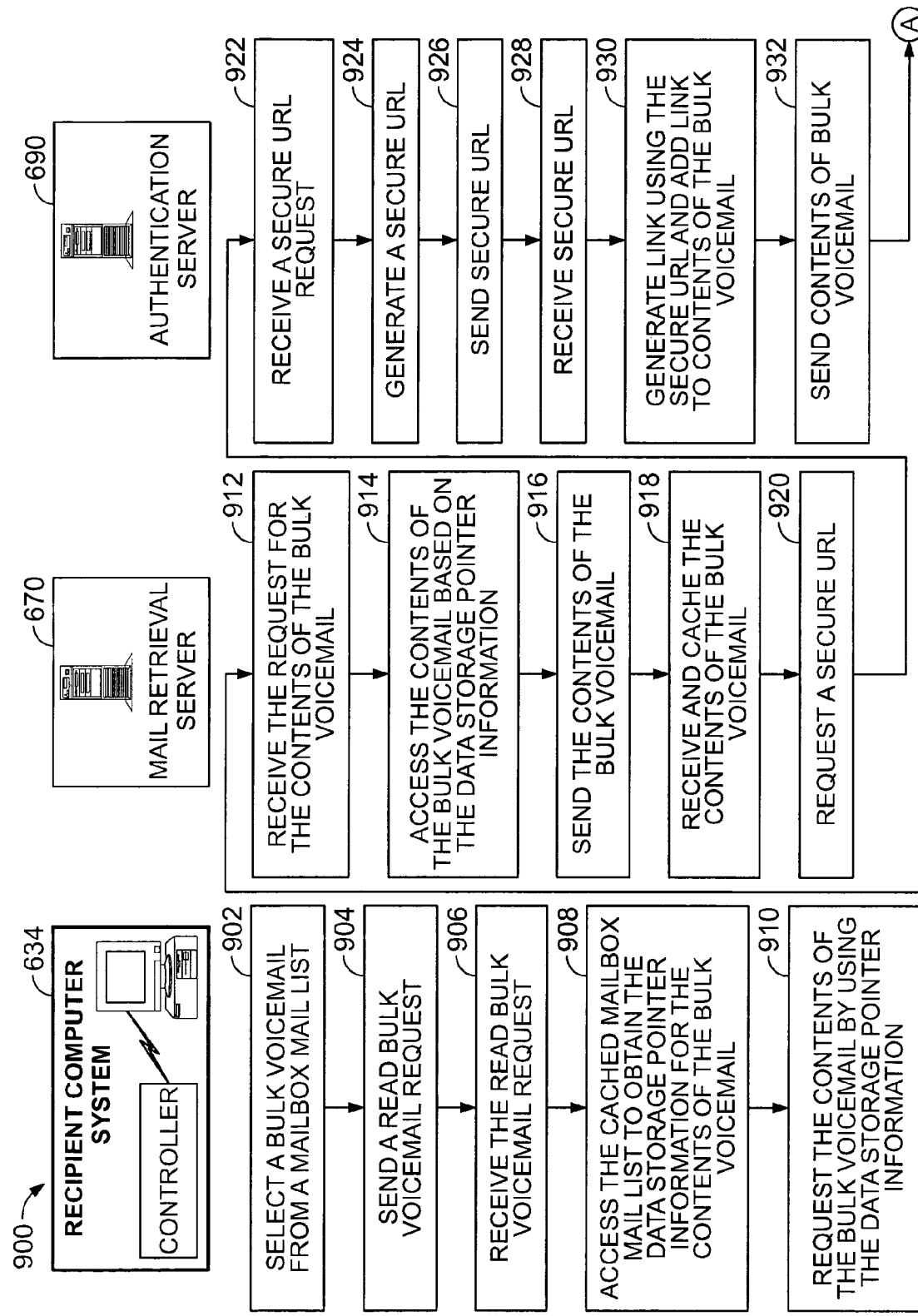
FIGS. 9A and 9B are a flow chart illustrating a process for enabling a user to play a bulk voicemail selected from a mailbox mail list using a recipient computer system.
Figure 9B:
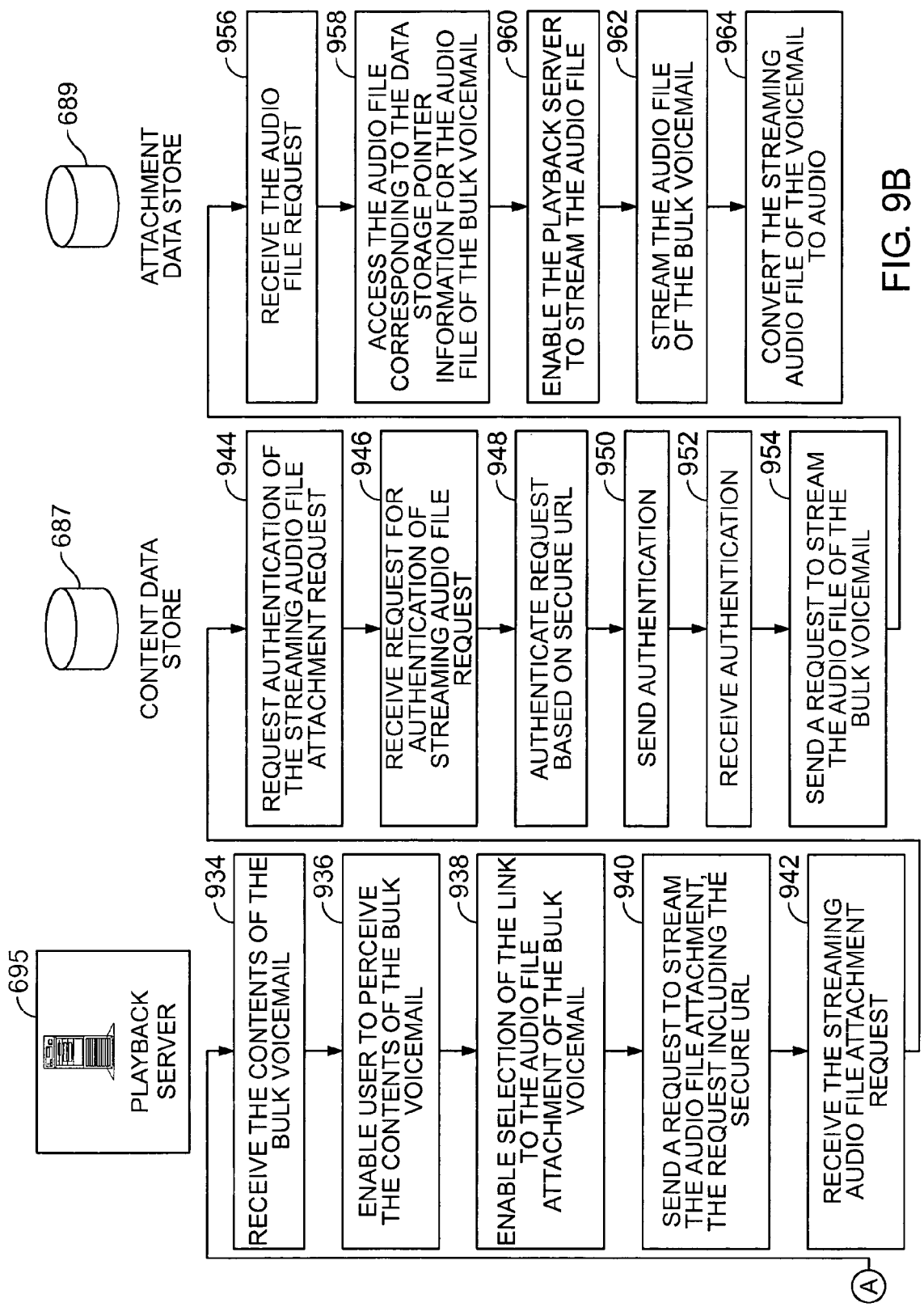

FIGS. 9A and 9B show a process 900 for enabling a user to play a bulk voicemail selected from a mailbox mail list using a recipient computer system 634. Process 900 also may be used to play a voicemail selected from a mailbox mail list using a recipient computer system 634.

A recipient uses the recipient computer system 634 to select a data entry corresponding to a bulk voicemail from the mailbox mail list (902). In one implementation example, the user selects a data entry 408 from the list 402 of the user interface of FIG. 4. The recipient computer system 634 sends a read bulk voicemail request to the mail retrieval server 670 (904).

The mail retrieval server 670 receives the read bulk voicemail request (906), accesses the cached mailbox mail list to obtain the data storage pointer information for the contents of the bulk voicemail (908), and requests the contents of the bulk voicemail from the content data store 687 using the data storage pointer information (910). The content data store 687 receives the request from the mail retrieval server 570 (912), accesses the contents of the bulk voicemail based on the data storage pointer information (914), and sends the contents of the bulk voicemail to the mail retrieval server 670 (916).

The mail retrieval server 670 receives and caches the contents of the bulk voicemail (918) and requests a secure URL from the authentication server 690 (920). The secure URL request may include the user identifier and the audio file storage pointer information accessed from the cached mailbox list. The authentication server 690 receives the secure URL request (922) and generates a secure URL (924). As discussed previously, the secure URL may be generated based on the time of the request, the date of the request, the user identifier, the audio file storage pointer information, and/or the IP address of the authentication server 690. The secure URL also may have a finite lifetime after which it will no longer be authenticated by the authentication server 690. The authentication server 690 sends the secure URL to the mail retrieval server (926).

The mail retrieval server 670 receives the secure URL (928), generates a hyperlink using the secure URL, and adds the hyperlink to the contents of the bulk voicemail (930). The mail retrieval server 670 sends the contents of the bulk voicemail to the recipient computer system 634 (932).

The recipient computer system 634 receives the contents of the bulk voicemail from the mail retrieval server 670 (934) and enables the user to perceive the contents of the bulk voicemail (936). In one implementation example, the recipient computer system 634 presents the interface 500 of FIG. 5 to the user to display the contents of the bulk voicemail in display 502. Display 502 displays both the message text of the bulk voicemail and the embedded hyperlink 503.

The user selects the link to the audio file attachment (938) and the recipient computer system 634 sends a request to the playback server 695 to stream the bulk voicemail audio file attachment (940). The request sent to the playback server 695 includes the secure URL generated by the authentication server 690. The playback server 695 receives the request from the recipient computer system 634 (942) and sends an authentication request to the authentication server 690 (944).

The authentication server 690 receives the authentication request (946) and determines whether to authenticate the request to stream the bulk voicemail audio file based on the received secure URL (948). The authentication server 690 sends an authentication response to the playback server 695 (950).

The playback server 695 receives the authentication response from the authentication server 690 (952). If the authentication response indicates that the secure URL is not valid, then the playback server 695 sends an appropriate error message to the recipient computer system 634 (not shown). If the authentication response indicates that the secure URL is valid, then the playback server 695 sends to the attachment data store 689 a request to stream the audio file of the bulk voicemail (954). The request sent to the attachment data store 689 includes the bulk voicemail audio file pointer information.

The attachment data store 689 receives the request to stream the audio file of the bulk voicemail (956) and accesses the audio file corresponding to the data storage pointer information for the bulk voicemail audio file (958). The attachment data store 689 enables the playback server 695 to stream the accessed audio file (960).

The playback server 695 streams the audio file of the bulk voicemail to the recipient computer system 634 (962). The recipient computer system 634 converts the streaming audio file to audio to allow the user to listen to the bulk voicemail audio message (964).

In another implementation, the playback server 695, instead of streaming the audio file to the recipient computer system 634, enables the recipient computer system 634 to download the complete audio file. Once downloaded, the audio file may be subsequently converted to audio by the recipient computer system 634.

Figure 10A:
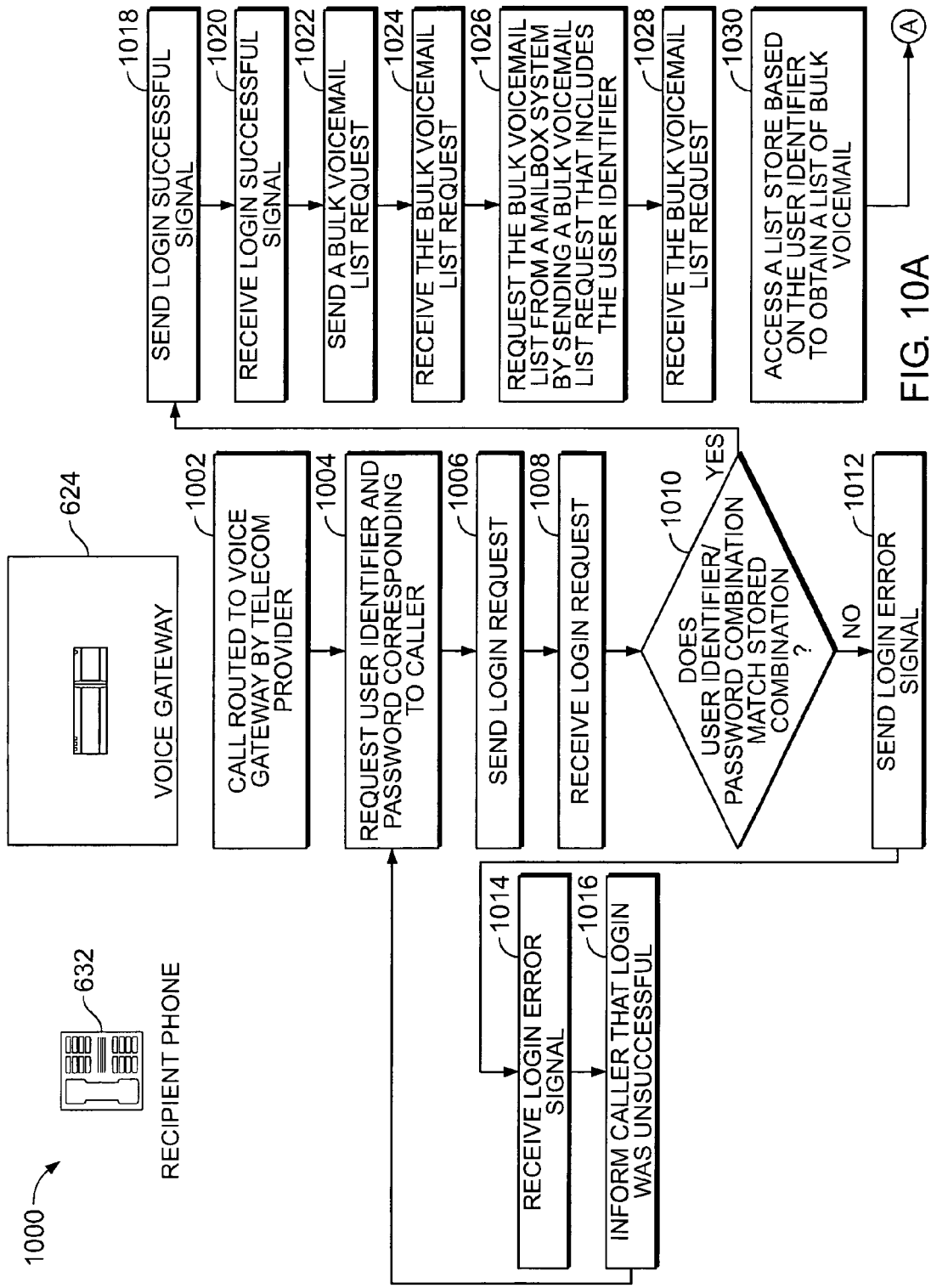
FIGS. 10A and 10B are a flow chart illustrating a process for enabling a user to perceive a list of received bulk voicemails using a recipient phone.
Figure 10B:
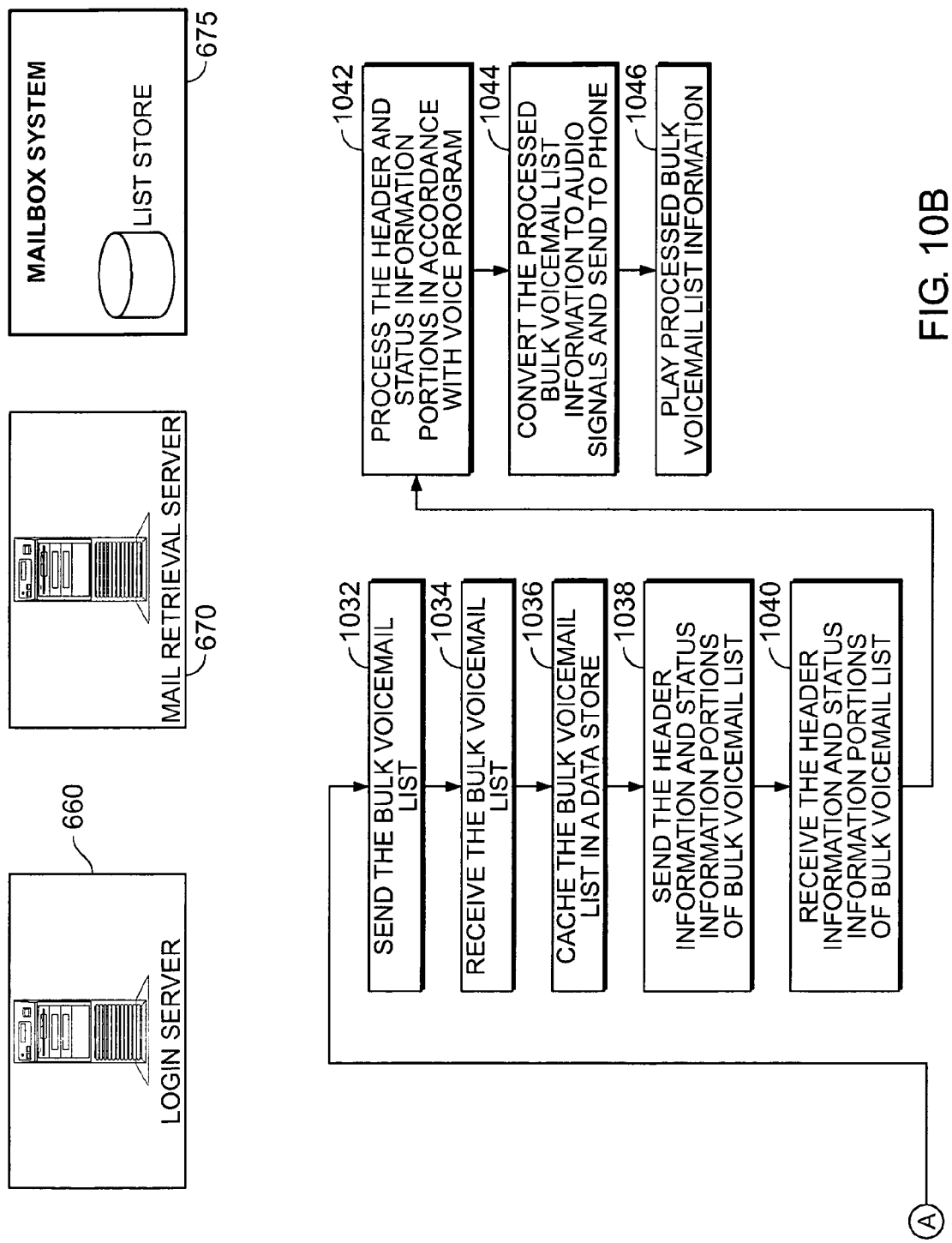

FIGS. 10A and 10B shows a process 1000 for enabling a user to perceive a list of received bulk voicemails or traditional voicemails using a recipient phone 632. A recipient uses the recipient phone 632 to call the voice gateway 622 in order to access his mailbox, and the call is routed to the voice gateway 622 by a telecom service provider (1002). Upon receiving the call, the voice gateway 622 requests a user identifier corresponding to the caller and requests that the caller provide a user password to authenticate the identity of the caller (1004). The user identifier may be determined by, for example, requesting that the caller input the user identifier directly or input information that may be used to determine the user identifier. Alternatively, the user identifier may be determined by accessing the call origination number from the telecom service provider (e.g., the telecom server provider provides the voice gateway 622 with ANI information) and looking up the user identifier in a data store (e.g., the registration data store 665) based on the call origination number.

The voice gateway 624 sends a login request to the login server 660 (1006). The login request includes the user identifier, or information that may be used by the login server 660 to determine the user identifier, and the password. The login server 660 receives the login request (1008) and then compares the password in the login request with the password stored in a configuration file stored in the registration data store 665 corresponding to the user identifier included in or determined from the login request (1010).

If the user identifier included in or determined from the login request is not found in a configuration file stored in the registration data store 665, or if the user identifier is found but the password in the login request is not the same as the corresponding password in the configuration file, then the login server 660 sends a login error signal to the voice gateway (1012). The login error signal informs the voice gateway 624 that either the user identifier was not found or that the user identifier was found but the password was not correct. The voice gateway 624 receives the login error signal (1014) and informs the caller that the login was unsuccessful (1016). The login server then either requests that the caller provide another user identifier and password (if the user identifier was not found) or requests that the caller provide another password (if the user identifier was found but the password was incorrect) (1004).

If the user identifier included in or determined from the login request is found in a configuration file stored in the registration data store 665, then the login server 660 sends a login successful signal to the voice gateway 624 (1018). Upon receiving the login successful signal from the login server 660 (1020), the voice gateway 624 sends a bulk voicemail list request to the mail retrieval server 670 (1022). The bulk voicemail list request sent to the mail retrieval server includes the user identifier corresponding to the caller.

The mail retrieval server 670 receives the bulk voicemail list request (1024) and sends a bulk voicemail list request to the mailbox system 675 (1026). The bulk voicemail list request sent to the mailbox system 675 includes the user identifier corresponding to the caller.

The mailbox system 675 receives the bulk voicemail list request (1028), accesses the list store 677 to obtain the bulk voicemail list that corresponds to the user identifier (1030), and sends the bulk voicemail list to the mail retrieval server 670 (1032). The bulk voicemail list includes some or all of the data entries corresponding to bulk voicemail stored in the mailbox of the caller. The data entries for each bulk voicemail include header information (including mail type), status information, and data storage pointer information.

The mail retrieval server 670 receives the bulk voicemail list from the mailbox system 675 (1034) and caches the bulk voicemail mail list (1036). The mail retrieval server 670 sends or otherwise makes accessible to the voice gateway 624 the header information and the status information of the data entries of the bulk voicemail list (1038).

The voice gateway 624 receives or otherwise accesses the header information and the status information of the data entries of the bulk voicemail list (1040) and processes the header information and status information in accordance with a voice program (1042). The voice program may, for example, use the status information to count how many new and old voicemails are in the mailbox of the caller and may use the header information to determine how many of the /s in the mailbox are bulk voicemails. Furthermore, the voice program may organize the /s and/or bulk voicemails in accordance with the header information including, for example, the subject line and the sender.

The voice gateway 624 may use prompts to present the processed bulk voicemail list information to the caller and provide the caller with menu options to peruse the list of bulk voicemails or voicemails (e.g., "You have X new bulk voicemails and Y new voicemails. Press 1 to listen to your bulk voicemails and press 2 to listen to your voicemails.") The processed bulk voicemail list information is converted to audio signals and sent to the recipient phone 632 (1044), which plays the processed bulk voicemail list information (1046). The voice program allows the user to peruse the bulk voicemail list and select a bulk voicemail for playback by recognizing touch tones and/or by recognizing speech through the use of grammars that limit the speech that is permitted to be recognized.

Figure 11A:
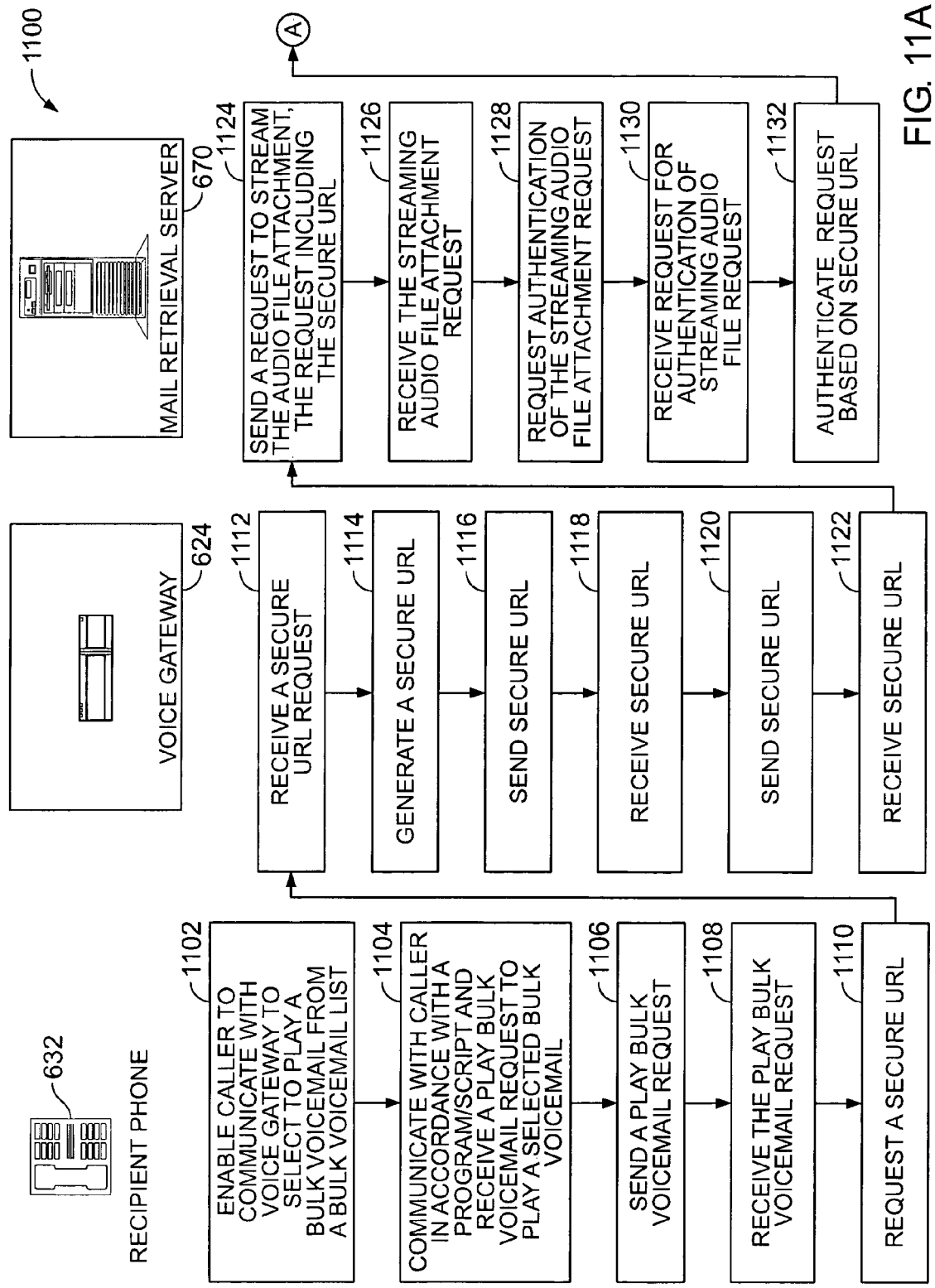
FIGS. 11A and 11B are a flow chart illustrating a process for enabling a user to play a bulk voicemail selected from a list of received bulk voicemails using a recipient phone.
Figure 11B:
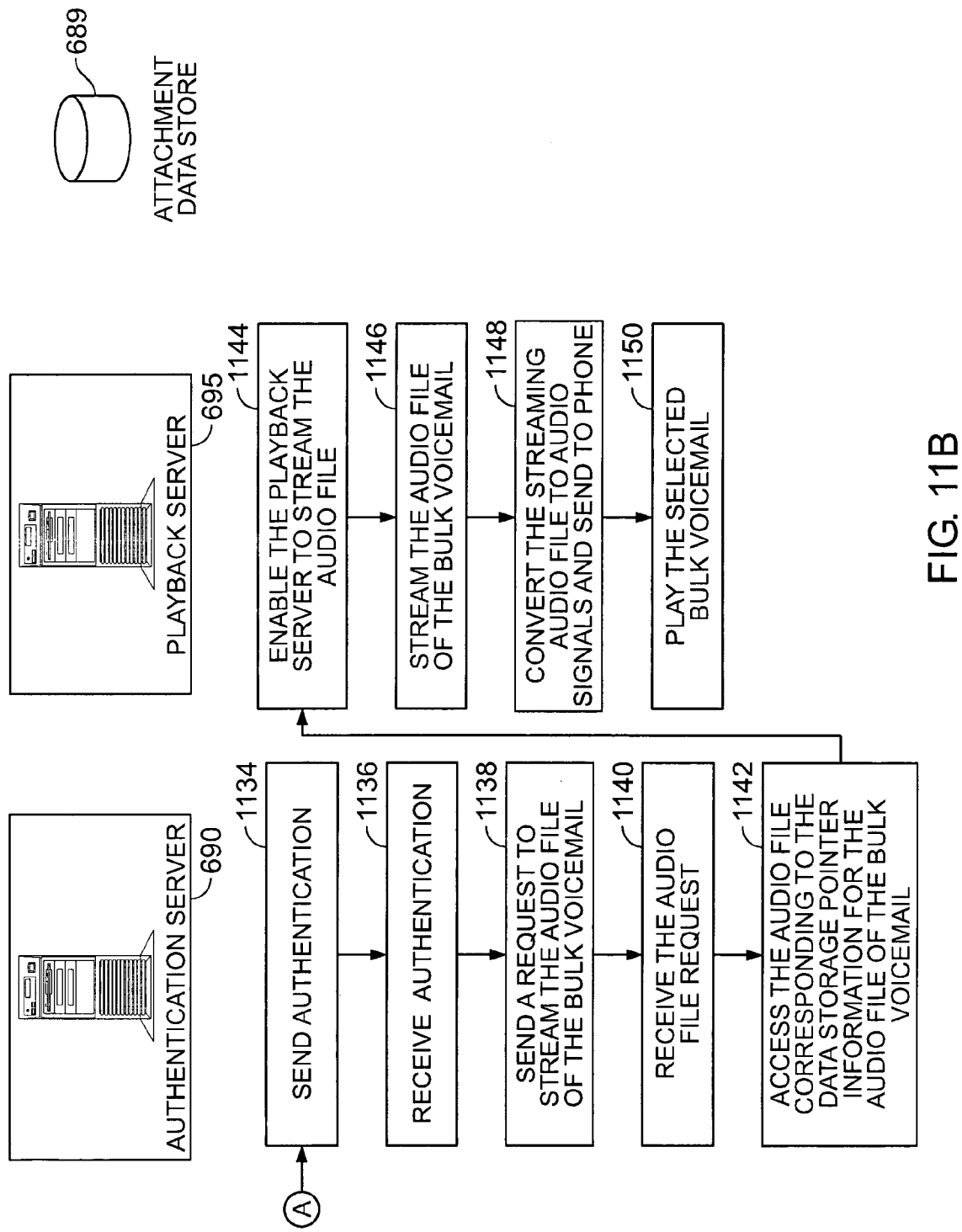

Referring to FIGS. 11A and 11B a process 1100 enables a user a play a bulk voicemail selected from a list of received bulk voicemails using a recipient phone 632. The process 1100 also may be used to play a voicemail selected from a list of received voicemails using the recipient phone 632.

The caller selects a bulk voicemail for playback by perusing the bulk voicemail list and speaking, pressing buttons, or otherwise interacting with the recipient phone 632 to select a particular bulk voicemail (1102). The selection is communicated to the voice gateway 622 as, for example, speech or touch tones in accordance with the menus presented to the user by the voice program (1104). The voice program sends a play bulk voicemail request to the mail retrieval server 670 (1106).

The mail retrieval server 670 receives the play bulk voicemail request (1108) and requests a secure URL from the authentication server 690 (1110). The request for a secure URL may include the user identifier corresponding to the caller and the cached bulk voicemail audio file data storage pointer information for the selected bulk voicemail. The authentication server 690 receives the secure URL request (1112), generates a secure URL (1114), and sends the secure URL to the mail retrieval server 670 (1116).

The mail retrieval server 670 receives the secure URL (1118) and sends the secure URL to the voice gateway 622 (1120). The voice gateway 622 receives the secure URL from the mail retrieval server 670 (1122) and sends a request to stream the audio file attachment to the playback server 695 (1124).

The process 1100 then proceeds through operations 1126-1144 that correspond to operations 942-960 of process 900.

The playback server 695 streams the audio file of the bulk voicemail to the voice gateway 622 (1146). The voice gateway 622 converts the streaming audio file to audio signals and sends the audio signals to the recipient phone 632 (1148). The recipient phone 632 plays the selected bulk voicemail list to the caller as the audio signals are received from the voice gateway 624 (1150).

Processes 700, 800, 900, 1000, 1100 are processes used to carry out a limited set of the mail service options that may be available to a user of the recipient system 634 (i.e., the processes are used to deposit a bulk voicemail, request a list of mail from a mailbox, and open a selected piece of mail). Processes for mail service options such as deleting, forwarding, and depositing pieces of mail are variants of the disclosed processes.

Figure 12:
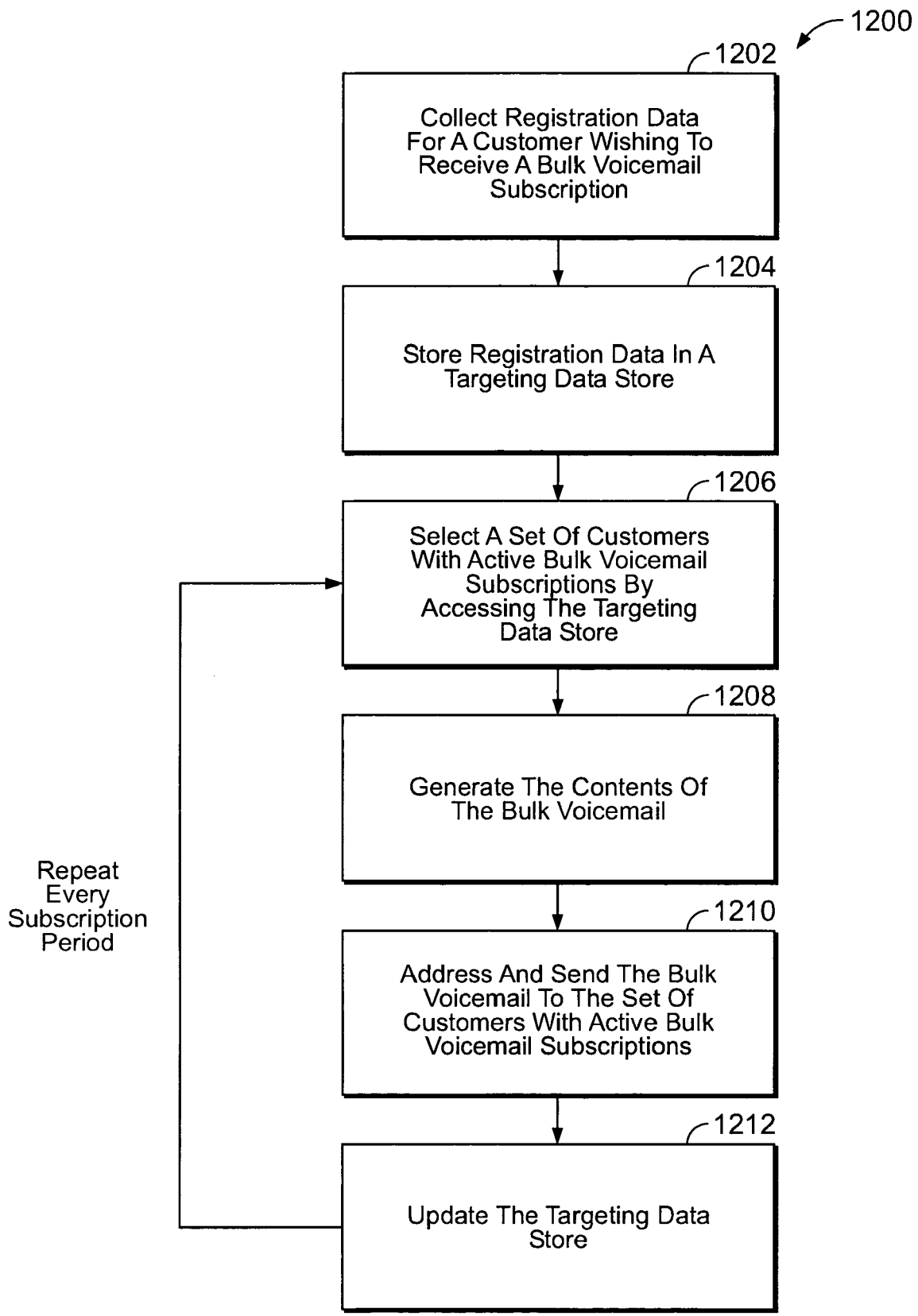
FIG. 12 is a flow chart illustrating a process for using a bulk voicemail targeting system to offer a bulk voicemail subscription service.

Referring to FIG. 12, a bulk voicemail targeting system may be used to provide a bulk voicemail subscription service according to a process 1200. Registration data is collected from/for one or more customers that wish to receive a bulk voicemail subscription (1202). The registration data may include customer-related information, such as, for example, customer contact information (address and telephone number) and a user identifier that corresponds to or will correspond to the customer. The registration data also may include subscription-related information, such as, for example, the type of subscription desired by the customer (e.g., a subscription to receive music content or poetry content), the subscription period (e.g., a monthly subscription for one year), delivery options (e.g., file format and time of day to send bulk voicemail), and billing options.

The collected registration data is stored in one or more configuration files in a targeting data store 112 (1204). The configuration files may include one or more flags that indicate the type of bulk voicemail subscription, the subscription period, and/or whether the bulk voicemail subscription is active.

The targeting data store 112 is accessed to select a set of customers that currently have an active bulk voicemail subscription (1206). The set of customers may be determined by, for example, querying the targeting data store 112 for customers associated with configuration files that include one or more flags that correspond to an active subscription of the subscription type currently being processed.

The contents of the bulk voicemail (i.e., the textual contents and the audio file) are selected or otherwise generated (1208). The contents of the bulk voicemail are typically selected or generated in accordance with the type and period of the subscription being processed (e.g., a classical music audio file is attached and the textual contents include "$3^{rd}$ Installment—March, 2003") (1208). In some implementations, the contents of the bulk voicemail are obtained by accessing multiple content data stores than each store content related to a given subscription type (e.g., poetry content and music content). The content data stores may be provided by a third party otherwise unrelated to an operator of the bulk voicemail targeting system and may be accessed through network 140.

A bulk voicemail is addressed and sent to the identified set of customers that currently have an active bulk voicemail subscription (1210). After sending the bulk voicemail, the configuration files stored in the targeting data store 112 may be modified to indicate that a bulk voicemail was sent and, for customers whose subscriptions have just ended upon transmission of the bulk voicemail, may be modified to indicate that the corresponding bulk voicemail subscription is now inactive (1212). Processes 1206-1212 repeat every subscription period.

Figure 13:
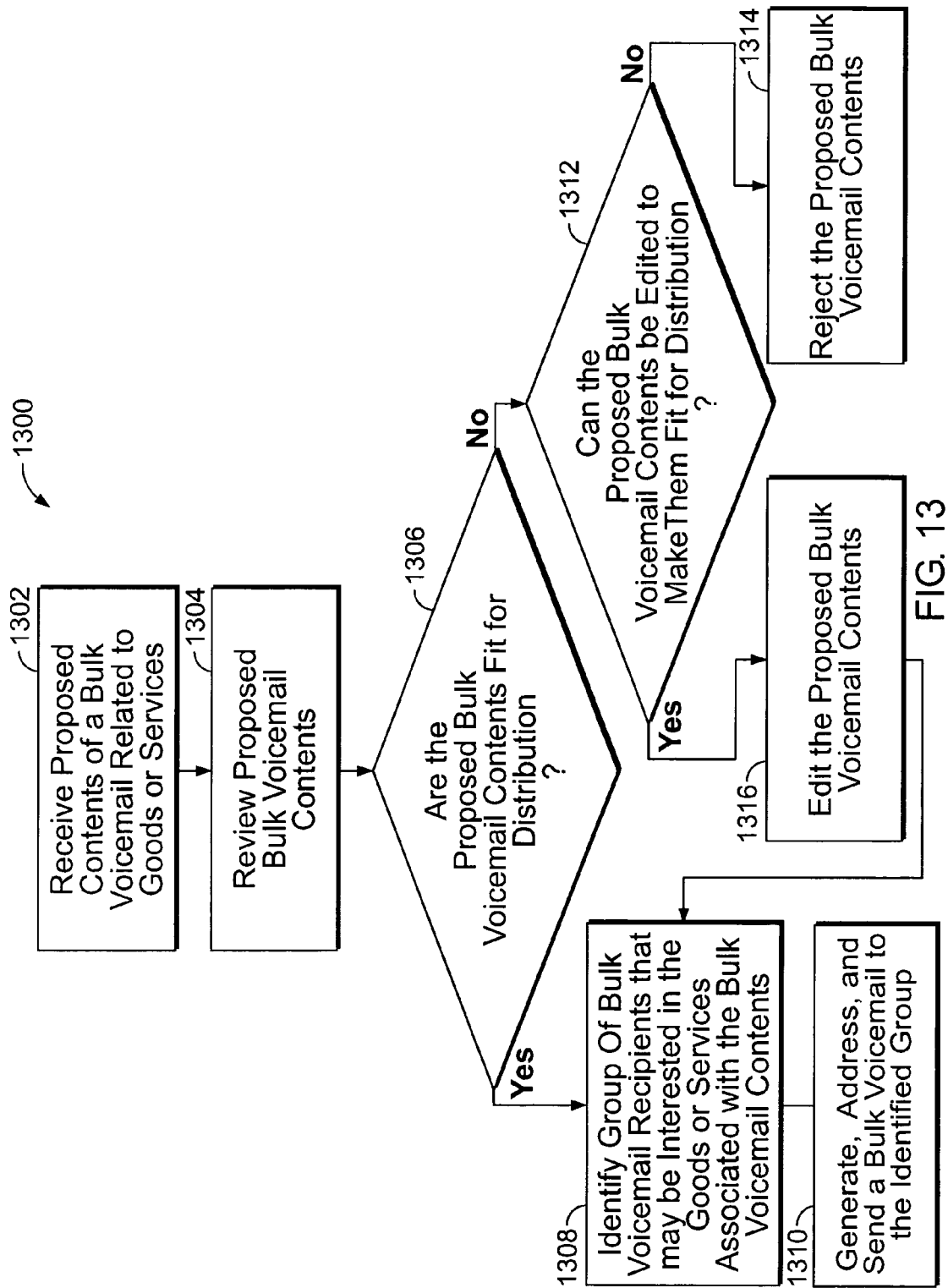
FIG. 13 is a flow chart illustrating a process for using a bulk voicemail targeting system to offer bulk voicemail marketing services.

Referring to FIG. 13, a bulk voicemail targeting system may be used to provide bulk voicemail marketing services according to a process 1300. Proposed contents of a bulk voicemail are received from an enterprise (1302). The proposed content of the bulk voicemail typically include textual contents and an audio message prompting or otherwise related to goods or services associated with the enterprise.

The proposed bulk voicemail contents are reviewed (1304) and a determination is made as to whether the proposed bulk voicemail contents are fit for distribution (1306) (e.g., inappropriate content may include offensive content or content that may not be welcomed by any potential bulk voicemail recipients). If the proposed bulk voicemail contents are fit for distribution, a group of bulk voicemail recipients is identified (1308). The identified group consists of bulk voicemail recipients that possess one or more characteristics that indicate that they are likely to be interested in the goods or services promoted by or otherwise mentioned in the bulk voicemail, which group may be selected based in part on the appropriateness of content, e.g., using parental or other access controls. The group of bulk voicemail recipients may be identified using, for example, the address section 310 of the bulk voicemail targeting system user interface 300.

A bulk voicemail is generated using the proposed contents, addressed to the identified group of bulk voicemail recipients, and delivered (1310). The proposed textual contents may be, for example, input into the contents section 320 of the user interface 300, and the proposed audio message may be stored in an audio file and attached to the bulk voicemail using the audio file attachment section 330 of the user interface 300. The bulk voicemail may then be sent by selecting the send button 342 in the options section 340.

If the proposed bulk voicemail contents submitted by the enterprise are not fit for distribution generally or with respect to the selected group of recipients, a determination is made as to whether the contents can be edited to make them fit for distribution (1312). If the proposed bulk voicemail contents are not fit for distribution and cannot be edited to make them fit for distribution, then the proposed bulk voicemail contents are rejected (1314). If, however, the proposed bulk voicemail contents are not fit for distribution but may be edited to make them fit for distribution (e.g., by changing the textual contents and/or the audio message), the proposed bulk voicemail contents are edited as necessary to make them fit for distribution (1316). A bulk voicemail is then generated and delivered using the proposed contents in accordance with operations 1308 and 1310.

A number of implementations have been described. Nevertheless, it will be understood that various modifications may be made. For example, the bulk voicemail targeting system 610 may be part of the recipient computer system 634. The authoring system 614 may be divided into an author tool and an editor tool. The author tool enables a potentially not trusted user to input the textual contents of the bulk voicemail, select a targeted group of recipients, and attach an audio message. The editor tool enables a trusted user to view the textual contents of the bulk voicemail input by the potentially not trusted user, listen to the audio message, edit the textual contents if necessary, and approve or disapprove of the delivery of the bulk voicemail. If delivery of the bulk voicemail is approved, the editor tool determines the target group identifier for the targeted group of recipients, generates a message file including bulk voicemail textual contents, audio file, and the target group identifier, and sends the message file to the addressing system 616.

The bulk voicemail targeting system 610 may be configured to automatically generate and deliver bulk voicemails at periodic intervals. For example, a subscription service may be automated through the use of, for example, scripts that interact with the authoring system 614 to periodically generate and send bulk voicemails to subscribers. In another implementation, scripts or another program may interact with one or more of the authoring system 614, the addressing system 616, and the delivery system 618 to automatically generate bulk voicemails and send the bulk voicemails to subscribers (e.g., the program may present a ready made message file to the addressing system or addressed message file to the delivery system).

A bulk voicemail may be generated by first selecting a target group of recipients and then tailoring at least some of the audio content of the bulk voicemail to the target group of recipients. Alternatively or additionally, a bulk voicemail may be generated by generating the audio content of the bulk voicemail and then tailoring or otherwise selecting a target group of recipients to which at least some of the audio content of the bulk voicemail will be presented.

Some operations in the disclosed processes may occur simultaneously or in any order. For example, operations 202-206 and operations 702-706 need not occur sequentially as described but may instead occur simultaneously or in any order. In some implementations, the user may be allowed to choose the order. In other implementations, the bulk voicemail targeting system 110 may impose an order in which operations 202-206 and 702-706 occur.

What is claimed is:

1. A computer-implemented method to deliver a bulk voicemail to a group of recipients, the method comprising:

accessing a data store configured to store targeting data related to a group of potential voicemail recipients, the targeting data including attributes describing the potential voicemail recipients;

receiving attributes of the potential voicemail recipients;

identifying voicemail recipients from among the group of potential voicemail recipients based on the targeting data;

creating a distribution list that does not preexist the receipt of the attributes and that includes identified voicemail recipients that satisfy the received attributes; and delivering a bulk voicemail to each identified voicemail recipient, the bulk voicemail including at least some audio content that is made available to all recipients within the group of identified voicemail recipients.

2. The method of claim 1, wherein identifying voicemail recipients from among the group of potential voicemail recipients based on the targeting data includes identifying voicemail recipients that subscribe to a bulk voicemail subscription service related to topics of interest to the identified voicemail recipients.

3. The method of claim 2, wherein the bulk voicemail subscription service comprises a service that regularly delivers bulk voicemails related to topics of interest to the mailboxes of the identified voicemail recipients.

4. The method of claim 3, wherein the delivered bulk voicemail includes news content.

5. The method of claim 3, wherein the delivered bulk voicemail includes music content.

6. The method of claim 3, wherein the delivered bulk voicemail includes literary or spiritual content.

7. The method of claim 3, wherein the delivered bulk voicemail includes advertising or promotional content.

8. The method of claim 3, wherein the delivered bulk voicemail includes content related to an online game.

9. The method of claim 1, wherein accessing the data store includes accessing demographic data for potential voicemail recipients.

10. The method of claim 1, wherein accessing the data store includes accessing data related to computer systems used by the potential voicemail recipients.

11. The method of claim 10, wherein accessing the data store includes accessing data related to computer systems available for use by the potential voicemail recipients to access the bulk voicemail.

12. The method of claim 1, wherein accessing the data store includes accessing data related to online services received by the potential voicemail recipients.

13. The method of claim 1, wherein accessing the data store includes accessing data related to personal interests of the potential voicemail recipients.

14. The method of claim 1, wherein accessing the data store includes accessing data related to the online social interactions of the potential voicemail recipients.

15. The method of claim 14, wherein accessing the data store includes accessing data related to membership in a buddy list.

16. The method of claim 14, wherein accessing the data store includes accessing data related to membership in an online chat group.

17. The method of claim 1, wherein delivering a bulk voicemail includes delivering a bulk voicemail that includes promotional content related to products or services identified as desirable to the identified voicemail recipients.

18. The method of claim 17, wherein accessing the data store comprises accessing data related to products or services identified as desirable to the potential voicemail recipients.

19. The method of claim 1, wherein delivering a bulk voicemail includes delivering a bulk voicemail that includes information related to products or services received or purchased by the identified voicemail recipients.

20. The method of claim 19, wherein accessing the data store comprises accessing data related to products or services received or purchased by the potential voicemail recipients.

21. The method of claim 19, wherein delivering a bulk voicemail includes delivering a bulk voicemail that includes customer service announcements.

22. The method of claim 1, wherein delivering a bulk voicemail includes delivering a bulk voicemail that includes entertainment content.

23. The method of claim 2, wherein delivering a bulk voicemail comprises delivering a bulk voicemail to a mail system able to process and store voicemails and e-mails.

24. The method of claim 1, wherein delivering a bulk voicemail comprises delivering a digital file including a header section, a contents section, and an attachments section.

25. The method of claim 24, wherein the attachments section includes an audio file that contains an audio message from a sender of the bulk voicemail to the identified voicemail recipients.

26. The method of claim 24, wherein the contents section includes textual contents and an embedded link that may be selected by the identified voicemail recipients to play the audio file.

27. The method of claim 1, wherein identifying voicemail recipients from among the group of potential voicemail recipients comprises selecting an identified group of voicemail recipients from among multiple identified groups of voicemail recipients and querying the targeting data store to retrieve user identifiers corresponding to the identified voicemail recipients.

28. The method of claim 1, wherein identifying voicemail recipients from among the group of potential voicemail recipients comprises identifying one or more common characteristics of the voicemail recipients and querying the targeting data store to obtain user identifiers of potential voicemail recipients possessing the one or more common characteristics.

29. The method of claim 28, wherein the user identifier comprises an e-mail address or a screen name.

30. A computer system to deliver bulk voicemails, the system comprising:
an authoring computer configured to enable a sender of a bulk voicemail to:
access a targeting data store to identify voicemail recipients from among a group of potential voicemail recipients based on targeting data that is stored in the targeting data store and that includes attributes describing the group of potential voicemail recipients,
specify attributes of the potential voicemail recipients,
create a distribution list that does not preexist the specification of the attributes and that includes identified voicemail recipients that satisfy the specified attributes, and
specify an audio file storing an audio message from the sender to the identified voicemail recipients, the audio message including at least some audio content that is made available to all recipients within the group of identified voicemail recipients; and
an addressing and delivery computer configured to generate and deliver the bulk voicemail including the audio message to each identified voicemail recipient.

31. The computer system of claim 30, further comprising the targeting data store.

32. The computer system of claim 30, wherein the authoring computer is configured to enable a sender of the bulk voicemail to input textual contents of the bulk voicemail.

33. The computer system of claim 30, wherein the authoring computer is configured to enable a sender of the bulk voicemail to create the audio file storing the audio message.

34. The computer system of claim 30, wherein the authoring computer is configured to create a message file containing the audio file and a target group identifier corresponding to the identified voicemail recipients and to send the message file to the addressing and delivery computer.

35. The computer system of claim 34, wherein the addressing and delivery system is configured to receive the message file, address the message file by accessing the targeting data store to retrieve user identifiers corresponding to the identified voicemail recipients, convert the addressed message file into one or more bulk voicemails, and send the one or more bulk voicemails to the identified voicemail recipients.

36. The computer system of claim 30, further comprising a mail handling system configured to receive the bulk voicemail and store the bulk voicemail in a mailbox of an identified voicemail recipient.

37. The computer system of claim 36, wherein the mail handling system is configured to process and store voicemails and e-mails.

38. The computer system of claim 30, wherein the bulk voicemail comprises a digital file including a header section, a contents section, and an attachments section.

39. The computer system of claim 38, wherein the attachments section includes an audio file that contains an audio message from a sender to the identified voicemail recipients.

40. The computer system of claim 38, wherein the contents section includes textual contents and an embedded link that may be selected by the identified voicemail recipients to play the audio file.

41. The computer system of claim 30, wherein the authoring computer is configured to enable a sender to access a targeting data store to identify voicemail recipients that subscribe to a bulk voicemail subscription service related to topics of interest to the identified voicemail recipients.

42. The computer system of claim 41, wherein the authoring computer or the addressing and delivery computer is configured to regularly deliver bulk voicemails related to topics of interest to the mailboxes of the identified voicemail recipients.

43. The computer system of claim 30, wherein the targeting data includes demographic data for potential voicemail recipients, such that the authoring computer is configured to enable a sender to access the targeting data store to identify voicemail recipients from among a group of potential voicemail recipients based on demographic data for potential voicemail recipients.

44. The computer system of claim 30, wherein the targeting data includes data related to computer systems used by the potential voicemail recipients, such that the authoring computer is configured to enable a sender to access a targeting data store to identify voicemail recipients from among a group of potential voicemail recipients based on data related to computer systems used by the potential voicemail recipients.

45. The computer system of claim 44, wherein the targeting data includes data related to computer systems available for use by the potential voicemail recipients to access the bulk voicemail, such that the authoring computer is configured to enable a sender to access a targeting data store to identify voicemail recipients from among a group of potential voicemail recipients based on data related to computer systems available for use by the potential voicemail recipients to access the bulk voicemail.

46. The computer system of claim 30, wherein the targeting data includes data related to online services received by the potential voicemail recipients, such that the authoring computer is configured to enable a sender to access a targeting data store to identify voicemail recipients from among a group of potential voicemail recipients based on data related to online services received by the potential voicemail recipients.

47. The computer system of claim 30, wherein the targeting data includes data related to personal interests of the potential voicemail recipients, such that the authoring computer is configured to enable a sender to access a targeting data store to identify voicemail recipients from among a group of potential voicemail recipients based on data related to personal interests of the potential voicemail recipients.

48. The computer system of claim 30, wherein the targeting data includes data related to online social interactions of the potential voicemail recipients, such that the authoring computer is configured to enable a sender to access a targeting data store to identify voicemail recipients from among a group of potential voicemail recipients based on data related to the online social interactions of the potential voicemail recipients.

49. The computer system of claim 48, wherein the targeting data includes data related to membership in a buddy list, such that the authoring computer is configured to enable a sender to access a targeting data store to identify voicemail recipients from among a group of potential voicemail recipients based on data related to membership in a buddy list.

50. The computer system of claim 48, wherein the targeting data includes data related to membership in an online chat group, such that the authoring computer is configured to enable a sender to access a targeting data store to identify voicemail recipients from among a group of potential voicemail recipients based on data related to membership in an online chat group.

51. The computer system of claim 30, wherein the addressing and delivery computer is configured to deliver a bulk voicemail that includes promotional content related to products or services identified as desirable to the identified voicemail recipients.

52. The computer system of claim 51, wherein the targeting data includes data related to products or services identified as desirable to the potential voicemail recipients, such that the authoring computer is configured to enable a sender to access a targeting data store to identify voicemail recipients from among a group of potential voicemail recipients based on data related to products or services identified as desirable to the potential voicemail recipients.

53. The computer system of claim 30, wherein the addressing and delivery computer system is configured to deliver a bulk voicemail that includes information related to products or services received or purchased by the identified voicemail recipients.

54. The computer system of claim 53, wherein the targeting data includes data related to products or services received or purchased by the potential voicemail recipients, such that the authoring computer is configured to enable a sender to access a targeting data store to identify voicemail recipients from among a group of potential voicemail recipients based on data related to products or services received or purchased by the potential voicemail recipients.

55. The computer system of claim 53, wherein the information comprises customer service announcements.

56. The computer system of claim 30, wherein the addressing and delivery computer system is configured to deliver a bulk voicemail that includes entertainment content.

* * * * *